US010510193B2

(12) United States Patent
Wells et al.

(10) Patent No.: US 10,510,193 B2
(45) Date of Patent: Dec. 17, 2019

(54) METHOD AND SYSTEM FOR GEOFENCING OF VEHICLE IMPOUND YARDS

(71) Applicants: Mark A. Wells, San Diego, CA (US); Ezra T. Peachey, San Diego, CA (US)

(72) Inventors: Mark A. Wells, San Diego, CA (US); Ezra T. Peachey, San Diego, CA (US)

(73) Assignee: SVR Tracking, Inc., San Diego, CA (US)

(*) Notice: Subject to any disclaimer, the term of this patent is extended or adjusted under 35 U.S.C. 154(b) by 1090 days.

(21) Appl. No.: 14/823,068

(22) Filed: Aug. 11, 2015

(65) Prior Publication Data

US 2016/0049014 A1  Feb. 18, 2016

Related U.S. Application Data

(60) Provisional application No. 62/036,319, filed on Aug. 12, 2014.

(51) Int. Cl.
  *G07B 15/02* (2011.01)
  *H04W 4/021* (2018.01)
  *G06Q 30/04* (2012.01)

(52) U.S. Cl.
  CPC .......... *G07B 15/02* (2013.01); *G06Q 30/04* (2013.01); *H04W 4/021* (2013.01)

(58) Field of Classification Search
  CPC ........ G07B 15/02; G06Q 30/04; H04W 4/021
  USPC ....................................... 705/7.35
  See application file for complete search history.

(56) References Cited

U.S. PATENT DOCUMENTS

| 5,311,197 | A  | 5/1994  | Sorden et al. |
| 5,974,312 | A  | 10/1999 | Hayes, Jr. et al. |
| 6,031,828 | A  | 2/2000  | Koro et al. |
| 6,295,449 | B1 | 9/2001  | Westerlage et al. |
| 6,314,270 | B1 | 11/2001 | Uchida |
| 6,665,613 | B2 | 12/2003 | Duvall |
| 6,862,524 | B1 | 3/2005  | Nagda et al. |
| 6,922,547 | B2 | 7/2005  | O'Neill et al. |
| 6,934,544 | B2 | 8/2005  | Cooper et al. |
| 7,196,621 | B2 | 3/2007  | Kochis |
| 7,339,469 | B2 | 3/2008  | Braun |
| 7,408,502 | B2 | 8/2008  | Percy et al. |
| 7,451,042 | B2 | 11/2008 | Uyeki et al. |
| 7,480,563 | B2 | 1/2009  | Ichimura |
| 7,484,663 | B2 | 2/2009  | Olsen, III et al. |
| 7,519,463 | B2 | 4/2009  | Olsen, III et al. |

(Continued)

OTHER PUBLICATIONS

Rinne et. al., "Mobile crowdsensing of parking space using geofencing and activity recognition" 10th ITS European Congress, Helsinki, Finland, Jun. 16-19, 2014 (Year: 2014).*

*Primary Examiner* — Kevin H Flynn
*Assistant Examiner* — Emmett K. Walsh
(74) *Attorney, Agent, or Firm* — Lesavich High-Tech Law Group, S.C.; Stephen Lesavich

(57) ABSTRACT

A method and system for geofencing of vehicle impound yards. One or more geofences around impound yards are selected. The one or more geofences are associated with one or more vehicles. When a vehicle enters the geofenced area, a user (e.g., an individual, car dealer, finance company, etc.) is immediately notified to prevent excessive impound financial charges. If a vehicle is left in a geofence area, a cumulative time duration and a cumulative finance charge are accurately recorded to reduce or prevent financial fraud.

20 Claims, 13 Drawing Sheets

(56) References Cited

U.S. PATENT DOCUMENTS

| | | |
|---|---|---|
| 7,538,667 B2 | 5/2009 | Koen |
| 7,877,198 B2 | 1/2011 | Tenzer et al. |
| 7,940,173 B2 | 5/2011 | Koen |
| 8,024,118 B2 | 9/2011 | Bradley et al. |
| 8,031,114 B2 | 10/2011 | Kellermeier et al. |
| 8,339,251 B2 | 12/2012 | Roberts, Sr. et al. |
| 8,463,765 B2 | 6/2013 | Lesavich |
| 8,587,420 B2 | 11/2013 | Koen |
| 8,599,003 B2 | 12/2013 | Roberts, Sr. et al. |
| 8,626,344 B2 | 1/2014 | Imes et al. |
| 8,670,933 B2 | 3/2014 | Schenken et al. |
| 8,766,791 B2 | 7/2014 | Koen et al. |
| 8,810,454 B2 | 8/2014 | Cosman |
| 8,823,502 B2 | 9/2014 | Berkobin et al. |
| 8,880,239 B2 | 11/2014 | Kleve et al. |
| 8,896,440 B2 | 11/2014 | Saeedi et al. |
| 8,971,873 B2 | 3/2015 | Yi et al. |
| 9,007,473 B1 | 4/2015 | Worley |
| 9,037,564 B2 | 5/2015 | Lesavich et al. |
| 9,066,464 B2 | 6/2015 | Schmidt et al. |
| 9,084,118 B2 | 7/2015 | Oesterling |
| 9,137,250 B2 | 9/2015 | Lesavich et al. |
| 9,361,479 B2 | 6/2016 | Lesavich et al. |
| 9,569,771 B2 | 2/2017 | Lesavich et al. |
| 2003/0227395 A1 | 12/2003 | Zeineh |
| 2004/0012506 A1 | 1/2004 | Fujiwara et al. |
| 2006/0061469 A1 | 3/2006 | Jaeger et al. |
| 2006/0109106 A1 | 5/2006 | Braun |
| 2006/0187026 A1 | 8/2006 | Kochis |
| 2006/0200305 A1 | 9/2006 | Sheha et al. |
| 2006/0220842 A1 | 10/2006 | Breed |
| 2006/0238347 A1 | 10/2006 | Parkinson et al. |
| 2007/0156324 A1 | 7/2007 | Percy et al. |
| 2007/0176771 A1 | 8/2007 | Doyle |
| 2007/0185728 A1* | 8/2007 | Schwarz ............... G06Q 10/06 701/36 |
| 2007/0219715 A1 | 9/2007 | Uyeki et al. |
| 2008/0094209 A1 | 4/2008 | Braun |
| 2008/0162034 A1 | 7/2008 | Breen |
| 2008/0186162 A1 | 8/2008 | Rajan et al. |
| 2008/0231446 A1* | 9/2008 | Cresto ................... G06Q 10/08 340/572.1 |
| 2009/0140886 A1 | 6/2009 | Bender |
| 2010/0042940 A1 | 2/2010 | Monday et al. |
| 2011/0037620 A1* | 2/2011 | Paun ....................... B60R 25/10 340/932.2 |
| 2011/0208710 A1 | 8/2011 | Lesavich |
| 2011/0280447 A1 | 11/2011 | Conwell |
| 2011/0295724 A1 | 12/2011 | Hill |
| 2012/0278622 A1 | 11/2012 | Lesavich et al. |
| 2013/0144771 A1* | 6/2013 | Boling .................. G08G 1/127 705/35 |
| 2014/0189792 A1 | 7/2014 | Lesavich et al. |
| 2014/0195663 A1* | 7/2014 | Hirschenberger .... H04W 4/003 709/223 |
| 2014/0349672 A1* | 11/2014 | Kern, Jr. .............. H04W 4/021 455/456.1 |
| 2015/0095156 A1* | 4/2015 | Sauerbrey ............ H04L 67/303 705/14.58 |
| 2015/0230053 A1* | 8/2015 | Scellato ................ H04W 4/021 455/456.3 |
| 2015/0302421 A1 | 10/2015 | Caton |
| 2015/0379301 A1 | 12/2015 | Lesavich et al. |
| 2016/0321654 A1 | 11/2016 | Lesavich et al. |
| 2017/0262863 A1 | 9/2017 | Wells |
| 2018/0260822 A1 | 9/2018 | Wells et al. |

\* cited by examiner

PROTOCOL STACK

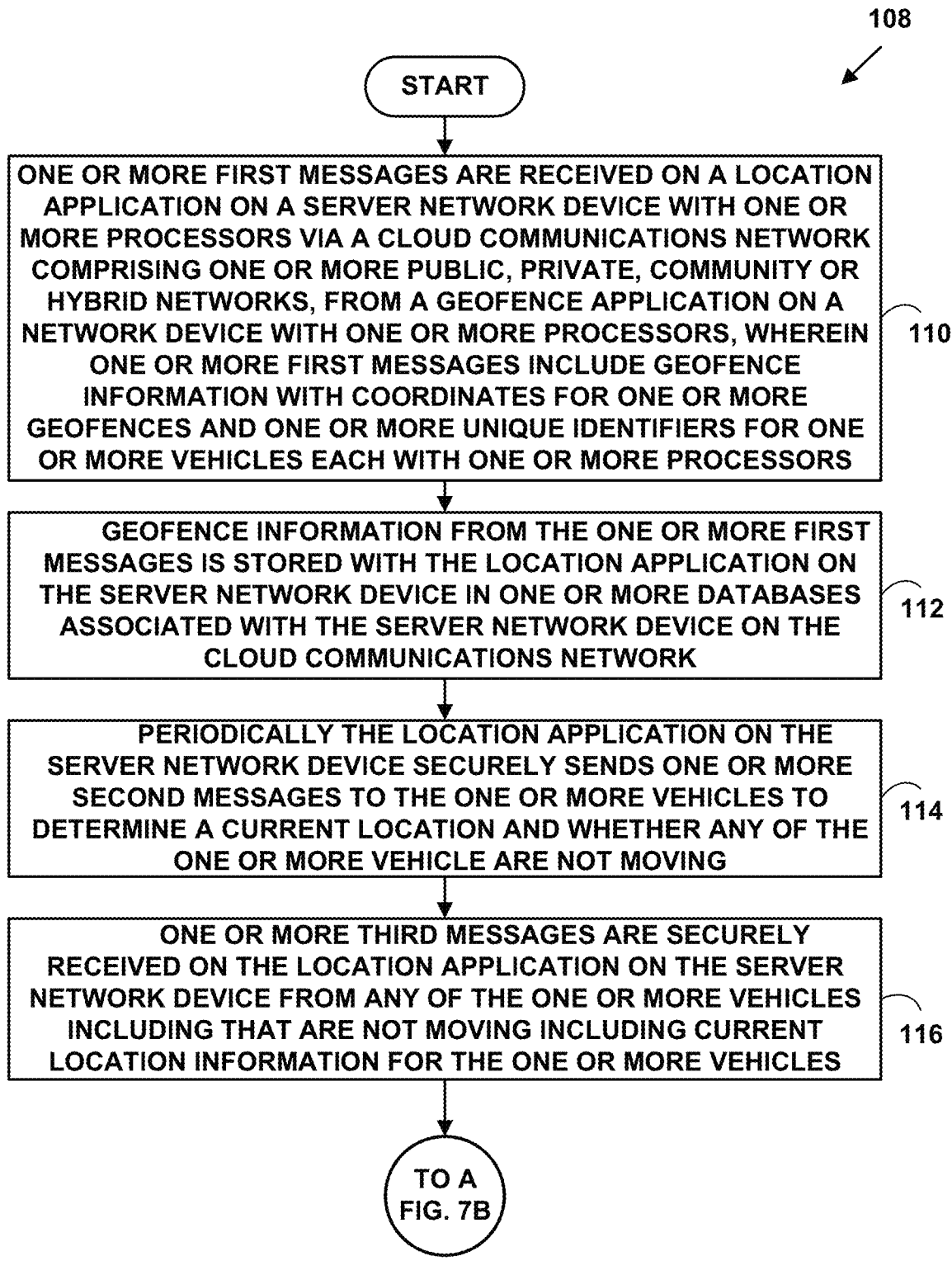

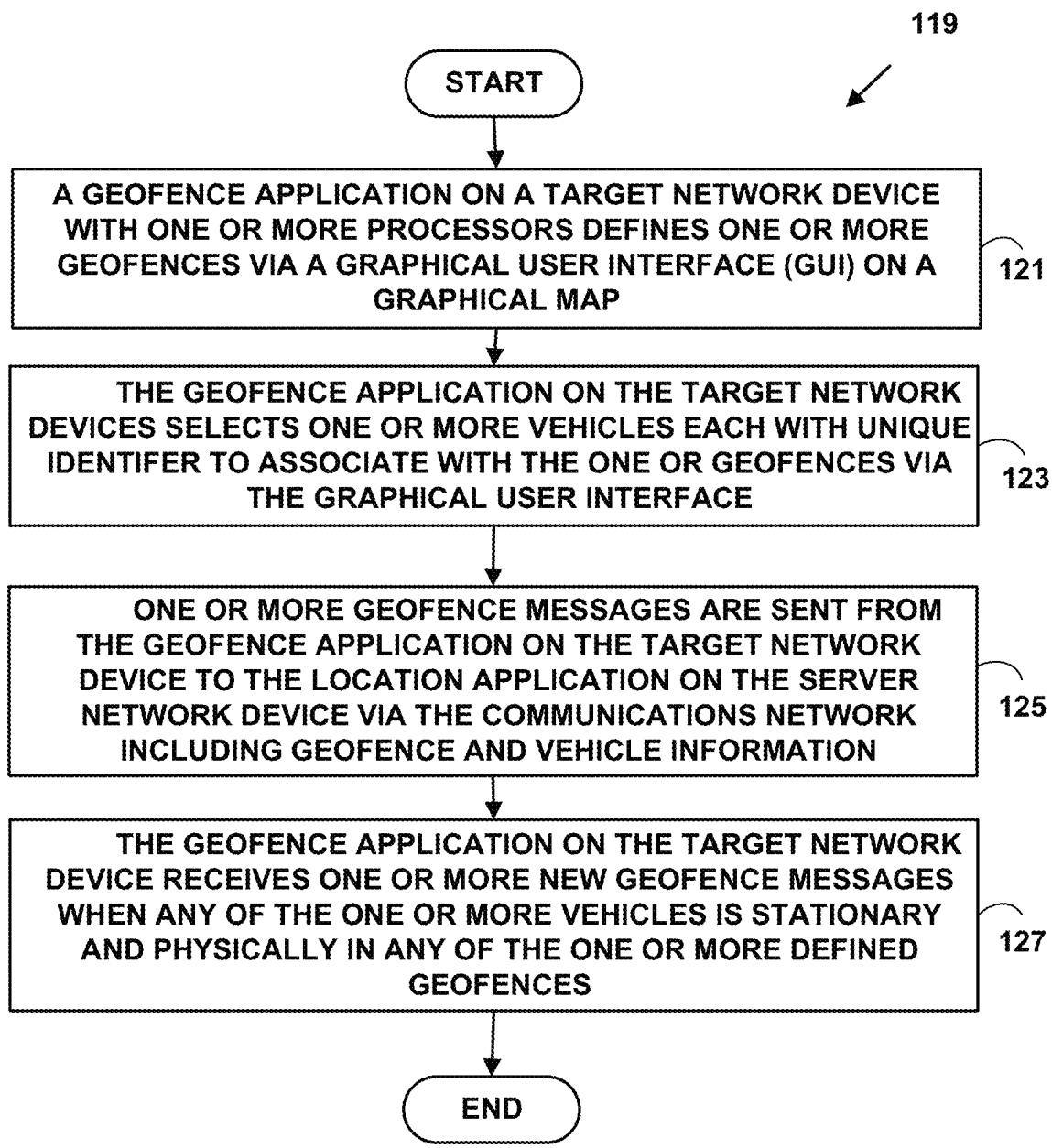

METHOD AND SYSTEM FOR GEOFENCING OF VEHICLE IMPOUND YARDS

CROSS REFERENCES TO RELATED APPLICATIONS

This application claims priority to U.S. Provisional Application No. 62/036,319, filed Aug. 12, 2014, the contents of which are incorporated by reference.

FIELD OF INVENTION

This application relates to geofencing. More specifically, it relates to a method and system for geofencing of vehicle impound yards.

BACKGROUND OF THE INVENTION

Impound yards are used to store vehicles that have been towed away by private companies, at the request of law enforcement, at the request of a car dealer, at the request of finance companies, etc.

Such impound yards charge a daily fee for storing vehicles that have been towed to the impound yard. In many instances, an owner of a vehicle, a car dealer, a finance company is not aware that the vehicle has been towed to the impound lot. As a result such parties may end up paying substantial daily impound lot fees over multiple days.

There are been attempts to solve some of the problems with goefencing. For example, U.S. Pat. No. 7,538,667 that issued to Koen teaches "A wireless device for facilitating for GPS-based asset tracking via a wireless communications network and a centralized management system. The wireless device includes dynamically configurable event profiles which allow the wireless device to be dynamically reconfigured and to perform certain actions based on a dynamically configurable combination of received events."

U.S. Pat. No. 7,940,173, that issued to Koen teaches "A wireless device for facilitating for GPS-based asset tracking via a wireless communications network and a centralized management system. The wireless device includes dynamically configurable event profiles which allow the wireless device to be dynamically reconfigured and to perform certain actions based on a dynamically configurable combination of received events."

U.S. Pat. No. 8,766,791, that issued to Koen et. al teaches "A wireless device for facilitating GPS-based asset tracking. The wireless device includes dynamically configurable event profiles which allow the wireless device to be dynamically reconfigured and to perform certain actions based on a dynamically configurable combination of received events. In addition, geofences with inherent aspects are used to trigger certain actions of the wireless device based on classes and attributes that define the inherent aspect."

U.S. Pat. No. 8,810,454 that issued to Cosman teaches "Embodiments enable geofencing applications and beacon watch lists. A computing device with at least a first processor and a second processor identifies a set of beacons associated with a geofence. The first processor consumes less power when operating than the second processor. The first processor is provided with the identified set of beacons. In beacon watch list embodiments, the first processor detects one or more beacons proximate to the computing device, compares the detected beacons with the provided set of beacons to determine whether the computing device is within the geofence, and updates a location status based on the comparison. In tiered geofencing implementations, the computing device switches among positioning modalities based on a distance from the computing device to the geofence to save power."

However, none of these problems solve of the problems associated with goefencing. Thus, it is desirable to solve some of the problems associated with knowing when vehicles are towed to impound yards.

SUMMARY OF THE INVENTION

In accordance with preferred embodiments of the present invention, some of the problems associated with geofencing are overcome. A method and system of geofencing of vehicle impound yards is presented.

A method and system for geofencing of vehicle impound yards. One or more geofences around impound yards are selected. The one or more geofences are associated with one or more vehicles. When a vehicle enters the geofenced area, a user (e.g., an individual, car dealer, finance company, etc.) is immediately notified with a message to prevent excessive impound charges. If a vehicle is left in a geofence area, a cumulative time duration and a finance charge are accurately recorded to reduce or prevent financial fraud.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 7A and 7B are a flow diagram illustrating a method for geofencing;

FIG. 8 is a flow diagram illustrating a method for geofencing;

DETAILED DESCRIPTION OF PREFERRED EMBODIMENTS

Figure 1:
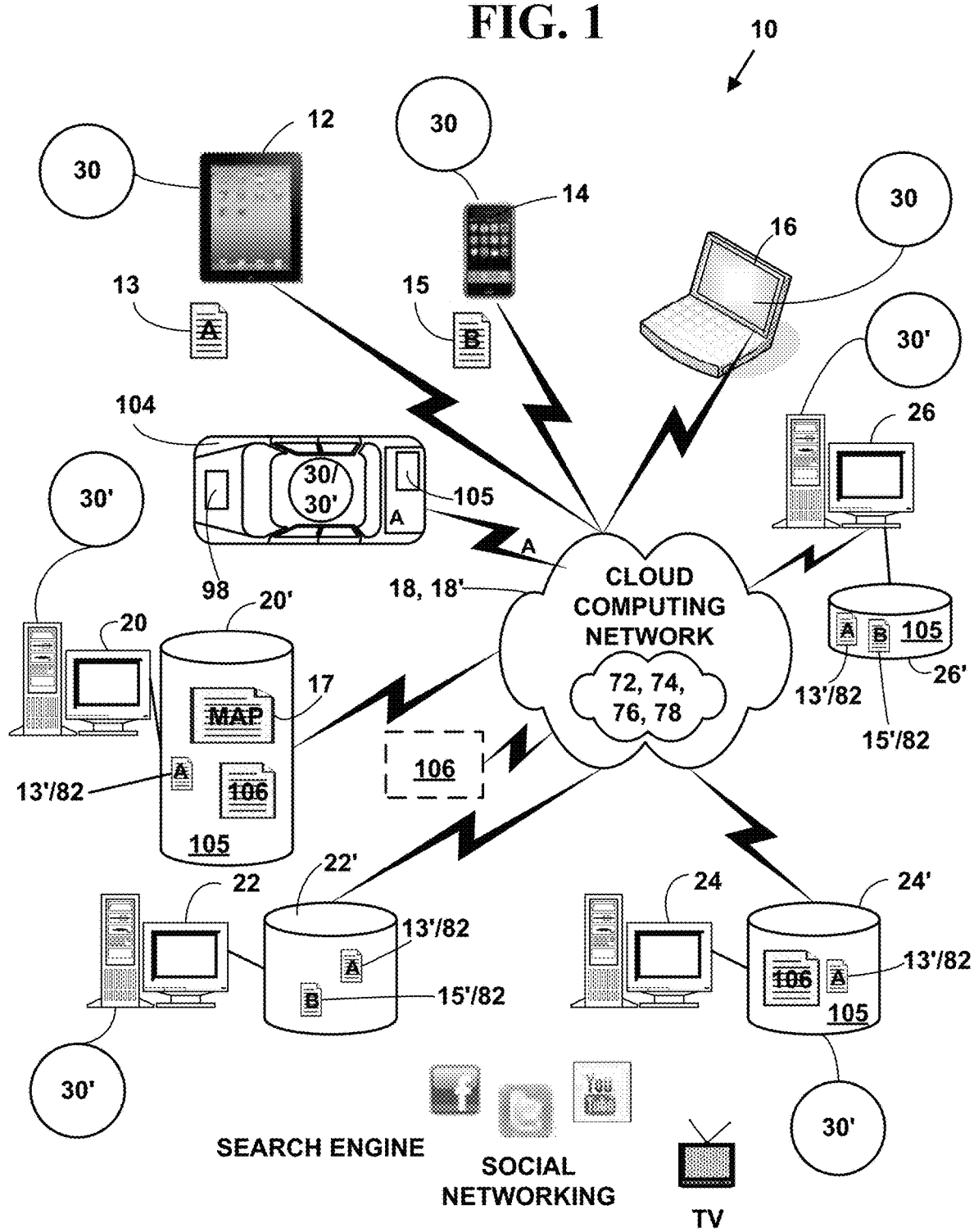
FIG. 1 is a block diagram illustrating an electronic information system.

FIG. 1 is a block diagram illustrating an exemplary electronic information system 10. The exemplary electronic system 10 includes, but is not limited to, one or more target network devices 12, 14, 16 (only three of which are illustrated) each with one or more processors and each with a non-transitory computer readable medium.

The one or more target network devices 12, 14, 16 include, but are not limited to, multimedia capable desktop and laptop computers, tablet computers, facsimile machines, mobile phones, non-mobile phones, smart phones, Internet phones, Internet appliances, personal digital/data assistants (PDA), two-way pagers, digital cameras, portable game consoles (Play Station Portable by Sony, Game Boy by Sony, Nintendo DSI, etc.), non-portable game consoles (Xbox by Microsoft, Play Station by Sony, Wii by Nintendo, etc.), cable television (CATV), satellite television (SATV) and Internet television set-top boxes, digital televisions including high definition television (HDTV), three-dimensional (3DTV) televisions and other types of network devices.

The one or more smart network devices 12, 14, 16 include smart phones such as the iPhone by Apple, Inc., Blackberry Storm and other Blackberry models by Research In Motion, Inc. (RIM), Droid by Motorola, Inc. HTC, Inc. other types of smart phones, etc. However, the present invention is not limited to such smart phone devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers.

The operating systems include the iPhone OS, Android, Windows, etc. iPhone OS is a proprietary operating system for the Apple iPhone. Andriod is an open source operating system platform backed by Google, along with major hardware and software developers (such as Intel, HTC, ARM, Motorola and Samsung, etc.), that form the Open Handset Alliance.

The one or more smart network devices 12, 14, 16 include tablet computers such as the iPad, by Apple, Inc., the HP Tablet, by Hewlett Packard, Inc., the Playbook, by RIM, Inc., the Tablet, by Sony, Inc.

The target network devices 12, 14, 16 are in communications with a cloud communications network 18 and/or non-cloud communications network 18' via one or more wired and/or wireless communications interfaces. The cloud communications network 18, is also called a "cloud computing network" herein and the terms may be used interchangeably.

The plural target network devices 12, 14, 16 received desired electronic content 13, 15 (e.g., electronic messages, etc.) stored on the cloud communications network 18.

The cloud communications network 18 includes, but is not limited to, communications over a wire connected to the target network devices, wireless communications, and other types of communications using one or more communications and/or networking protocols.

Plural server network devices 20, 22, 24, 26 (only four of which are illustrated) each with one or more processors and a non-transitory computer readable medium include one or more associated databases 20', 22', 24', 26'. The plural network devices 20, 22, 24, 26 are in communications with the one or more target devices 12, 14, 16 via the cloud communications network 18.

Plural server network devices 20, 22, 24, 26 (only four of which are illustrated) are physically located on one more public networks 76 (See FIG. 4), private networks 72, community networks 74 and/or hybrid networks 78 comprising the cloud network 18.

One or more server network devices (e.g., 20, etc.) securely stores a cloud content location map 17 and other plural server network devices (e.g., 22, 24, 26, etc.) store portions 13', 15' of desired electronic content 13, 15 as cloud storage objects 82 (FIG. 5) as is described herein.

The plural server network devices 20, 22, 24 26, include, but are not limited to, World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for cloud computing providers, etc.

The cloud communications network 18 includes, but is not limited to, a wired and/or wireless communications network comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks 18.

The cloud communications network 18 includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary electronic information display system 10 include a processing system with one or more high speed Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Exemplary Electronic Content Display System

Figure 2:
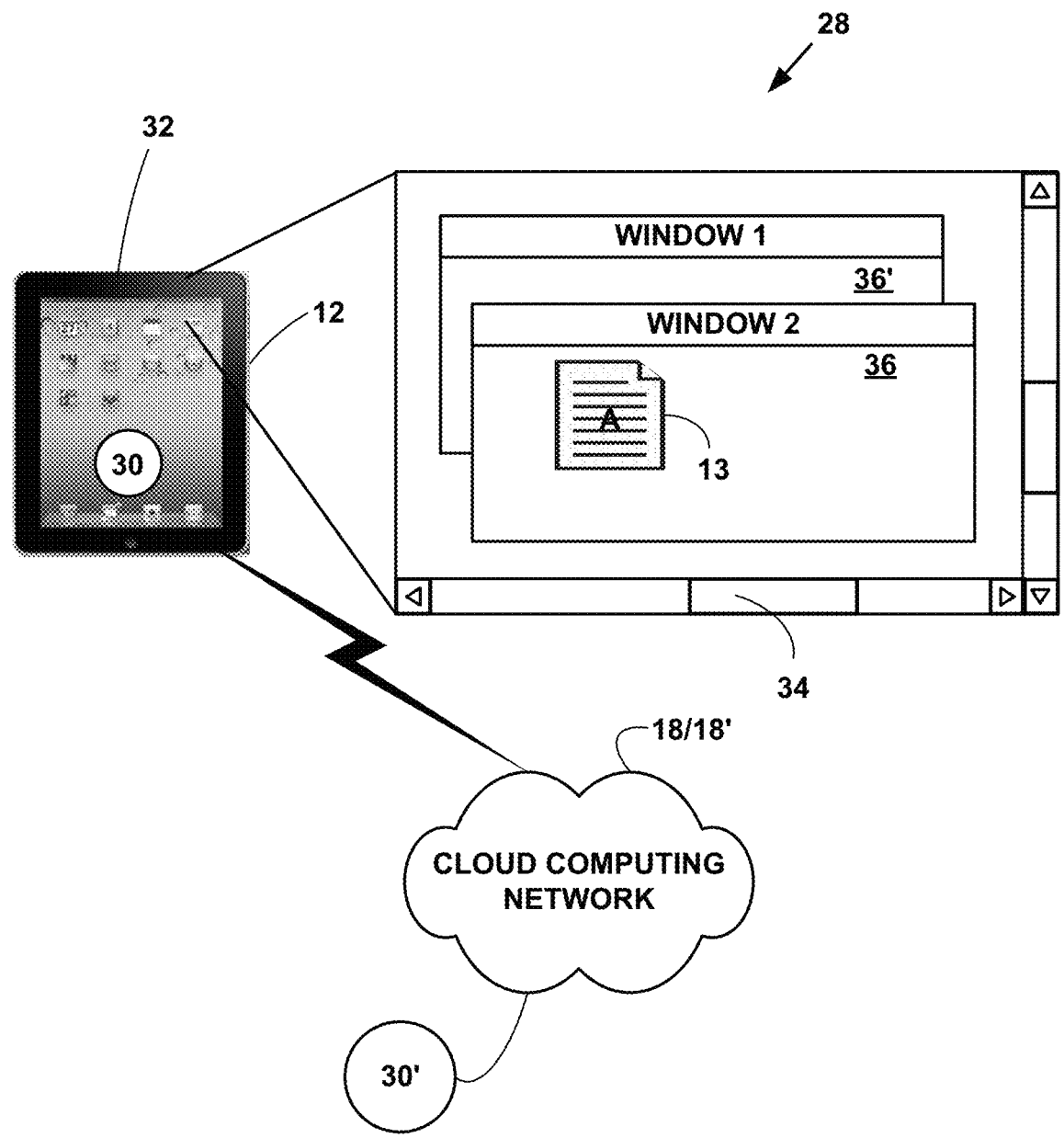
FIG. 2 is a block diagram illustrating an exemplary electronic content information display system.

FIG. 2 is a block diagram illustrating an exemplary electronic content information display system 28. The exemplary electronic information system display system includes, but is not limited to a target network device (e.g., 12, etc.) with a cloud application 30 and a display component 32. The cloud application 30 presents a graphical user interface (GUI) 34 on the display 32 component. The GUI 32 presents a multi-window 36, 36', etc. (only two of which are illustrated) interface to a user.

In one embodiment of the invention, the cloud application 30 is a software application. However, the present invention is not limited to this embodiment and the cloud application 30 can be hardware, firmware, hardware and/or any combination thereof. However, the present invention is not limited these embodiments and other embodiments can be used to practice the invention.

In another embodiment, a portion of the cloud application 30 is executing on the target network devices 12, 14, 16 and another portion of the application 30' is executing on the server network devices 20, 22, 24, 26. However, the present invention is not limited these embodiments and other embodiments can be used to practice the invention. In one embodiment, the application 30 includes a geofence application and application 30' includes a location application. In another embodiment, application 30/30' is a non-cloud application. However, the present invention is not limited these embodiments and other embodiments can be used to practice the invention.

In one embodiment, the application 30/30' includes an application programming interface (API). An application programming interface (API) specifies how some software components interact with each other. In addition to accessing databases or computer hardware, such as hard disk drives or video cards, an API is used to ease the work of programming GUI components, to allow integration of new features into existing applications (a so-called "plug-in API"), or to share data between otherwise distinct applications. An API includes a library that includes specifications for routines, data structures, object classes, and variables. In some other cases, notably for REpresentational State Transfer (REST) and Simple Object Access Protocol (SOAP) services, an API comes as a specification of remote calls exposed to the API consumers. However, the present invention is not limited these embodiments and other embodiments can be used to practice the invention, with and/or without an API.

Exemplary Networking Protocol Stack

Figure 3:
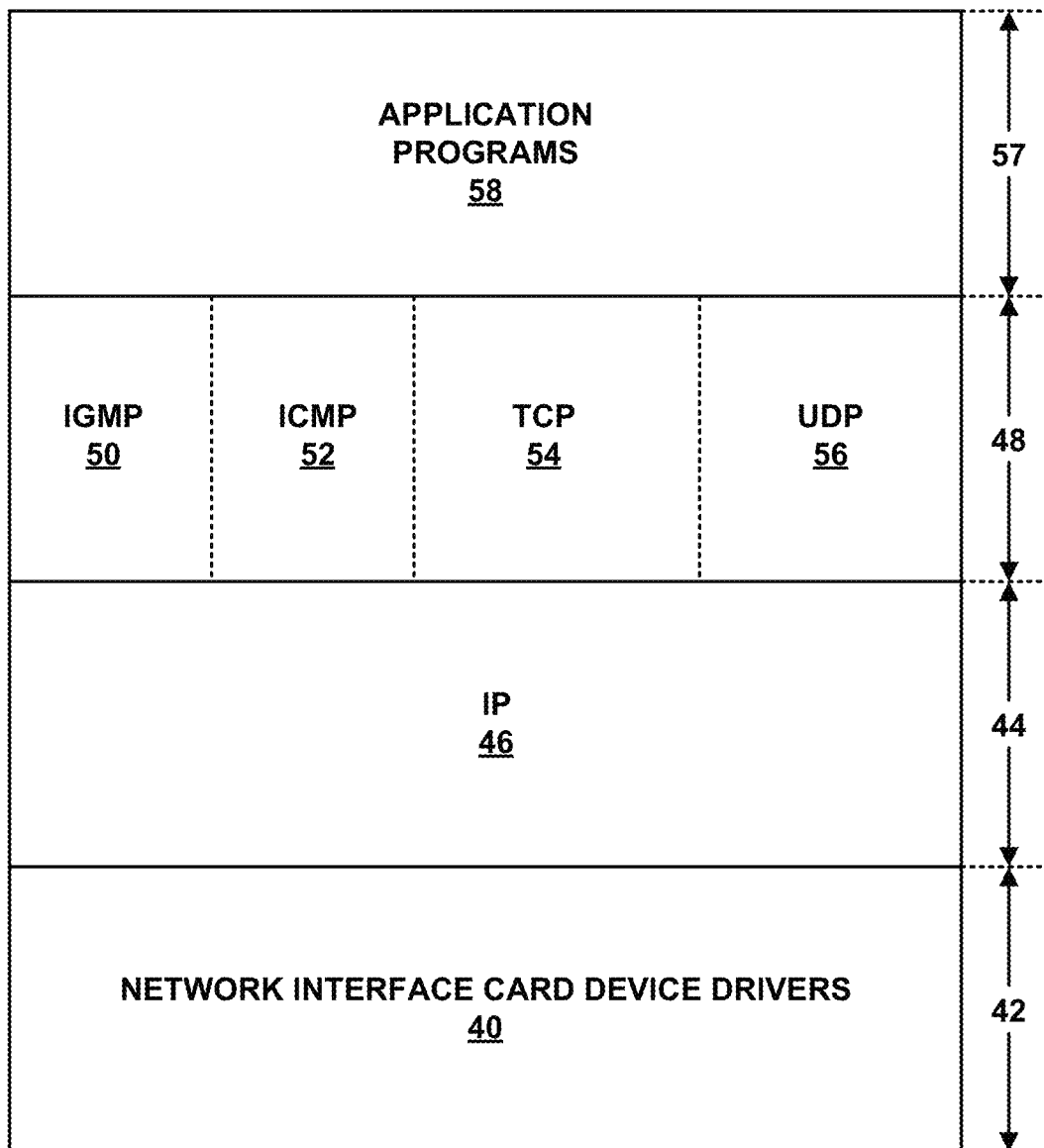
FIG. 3 a block diagram illustrating a layered protocol stack for network devices in the electronic information display system.

FIG. 3 a block diagram illustrating a layered protocol stack 38 for network devices in the electronic information display system 10. The layered protocol stack 38 is described with respect to Internet Protocol (IP) suites comprising in general from lowest-to-highest, a link 42, network 44, transport 48 and application 57 layer. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer.).

The network devices 12, 14, 16, 20, 22, 24, 26 are connected to the communication network 18 with Network Interface Card (NIC) cards including device drivers 40 in a link layer 42 for the actual hardware connecting the network devices 12, 14, 16, 20, 22, 24, 26 to the cloud communications network 18. For example, the NIC device drivers 40 may include a serial port device driver, a digital subscriber line (DSL) device driver, an Ethernet device driver, a wireless device driver, a wired device driver, etc. The device drivers interface with the actual hardware being used to connect the network devices to the cloud communications network 18. The NIC cards have a medium access control (MAC) address that is unique to each NIC and unique across the whole cloud network 18. The Medium Access Control (MAC) protocol is used to provide a data link layer of an Ethernet LAN system and for other network systems.

Above the link layer 42 is a network layer 44 (also called the Internet Layer for Internet Protocol (IP) suites). The network layer 44 includes, but is not limited to, an IP layer 46.

IP 46 is an addressing protocol designed to route traffic within a network or between networks. However, more fewer or other protocols can also be used in the network layer 44, and the present invention is not limited to IP 46. For more information on IP 54 see IETF RFC-791, incorporated herein by reference.

Above network layer 44 is a transport layer 48. The transport layer 48 includes, but is not limited to, an optional Internet Group Management Protocol (IGMP) layer 50, a Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs 58 (e.g., 30, 30', etc.) to carry out desired functionality for a network device reside. For example, the application programs 54 for the client network devices 12, 14, 16 may include a web-browsers or other application programs, cloud application program 30, while application programs for the server network devices 20, 22, 24, 26 may include other application programs (e.g., 30', etc.).

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.) and/or other protocols from other protocol suites may also be used in protocol stack 38.

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum.

Exemplary Wireless Interfaces

In one embodiment of the present invention, the wireless interfaces on network devices 12, 14, 16, 20, 22, 24, 26 include but are not limited to, 3G and/or 4G IEEE 802.11a, 802.11b, 802.11g, 802.11n, 802.15.4 (ZigBee), "Wireless Fidelity" (Wi-Fi), Wi-Fi Aware, "Worldwide Interoperability for Microwave Access" (WiMAX), ETSI High Performance Radio Metropolitan Area Network (HIPERMAN), "RF Home," Near Field Communications (NFC) and/or Machine-to-Machine (M2M) wireless interfaces. In another embodiment of the present invention, the wireless sensor device may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a.

Wi-Fi Aware is a new capability for energy-efficient, proximity-based service discovery among Wi-Fi capable devices. The technology in Wi-Fi Aware enables network devices to discover other devices, applications, and information nearby before making a Wi-Fi connection. Wi-Fi Aware makes contextual awareness more immediate and useful, enabling personalized applications (e.g., 30, 30', etc.) that continuously scan surroundings, anticipate actions, and notify of services and selected preferences. Wi-Fi Aware devices go through a process of discovery and synchronization, establishing a common "heartbeat" that enables very power efficient operation. Devices form clusters and exchange small messages about services available nearby, enabling immediate discovery. Wi-Fi Aware's ability to send and receive tiny messages before establishing a network 18, 18' connection further enables a two-way conversation among network devices in emergency and non-emergency situations whose current physical geographic locations and/or 2D/3D geo-space (X,Y) and/or (X,Y,Z) information may be known and available. This capability not only enables a network device to discover nearby information and services, but request additional information, such as emergency location information—all without establishing, an Internet, PSTN, or other network connections 18, 18'. The Wi-Fi Aware reference document, wp_Wi-Fi_Aware_Industry_20150714_v2, Jul. 14, 2015, is incorporated herein by reference.

In one embodiment, the applications 30, 30' include Wi-Fi Aware capabilities. In one embodiment the wireless interfaces include Wi-Fi Aware wireless interface capabilities. However, the present invention is not limited to these embodiments and the invention can be practiced without Wi-Fi Aware capabilities.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the domain name "www.ieee802.org" and "www.zigbee.org" respectively.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the domain name "www.wimax-forum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the domain name "www.etsi.org." ETSI HIPERMAN can be used to provide a WLP.

In one embodiment, the plural server network devices 20, 22, 24, 26 include a connection to plural network interface cards (NICs) in a backplane connected to a communications bus. The NIC cards provide gigabit/second ($1 \times 10^9$ bits/second) communications speed of electronic information. This allows "scaling out" for fast electronic content retrieval. The NICs are connected to the plural server network devices 20, 22, 24, 26 and the cloud communications network 18. However, the present invention is not limited to the NICs described and other types of NICs in other configurations and connections with and/or without a buses can also be used to practice the invention.

In one embodiment, network devices 12, 14, 16, 20, 22, 24, 26 and wired and wireless interfaces including the NICs include "4G" components. "4G" refers to the fourth generation of wireless communications standards and speeds of 100 megabits/second to gigabits/second or more. 4G includes peak speed requirements for 4G service at least 100 Mbit/s for high mobility communication (e.g., trains, vehicles, etc.) and 1 Gbit/s for low mobility communication (e.g., pedestrians and stationary users, etc.).

4G technologies are a successor to 3G and 2G standards. The nomenclature of the generations generally refers to a change in the fundamental nature of the service. The first was the move from analogue (1G) to digital (2G) transmission. This was followed by multi-media support, spread spectrum transmission and at least 200 kbits/second (3G). The 4G NICs include IP packet-switched NICs, wired and wireless ultra-broadband (i.e., gigabit speed) access NICs, Worldwide Interoperability for Microwave Access (WiMAX) NICs WiMAX Long Term Evolution (LTE) and/or multicarrier transmission NICs. However, the present invention is not limited to this embodiment and 1G, 2G and 3G and/or any combination thereof, with or with 4G NICs can be used to practice the invention.

In one embodiment of the invention, the WiMAX interfaces includes WiMAX 4G Long Term Evolution (LTE) interfaces. The ITU announced in December 2010 that WiMAX and LTE are 4G technologies. One of the benefits of 4G LTE is the ability to take advantage of advanced topology networks including those on cloud communications networks 18 such as optimized heterogeneous networks with a mix of macrocells with low power nodes such as picocells, femtocells and new relay nodes. LTE further improves the capacity and coverage, and helps ensures user fairness. 4G LTE also introduces multicarrier technologies for ultra-wide bandwidth use, up to 100 MHz of spectrum supporting very high data rates.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18.

The one or more target network devices 12, 14, 16 and one or more server network devices 20, 22, 24, 26 also communicate with each other and other network devices with near field communications (NFC) and/or machine-to-machine (M2M) communications.

"Near field communication (NFC)" is a set of standards for smartphones and similar devices to establish radio communication with each other by touching them together or bringing them into close proximity, usually no more than a few centimeters. Present and anticipated applications include contactless transactions, data exchange, and simplified setup of more complex communications such as Wi-Fi. Communication is also possible between an NFC device and an unpowered NFC chip, called a "tag" including radio frequency identifier (RFID) 99 tags.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

Short Message Service (SMS) is a text messaging service component of phone, Web, or mobile communication systems. It uses standardized communications protocols to allow fixed line or mobile phone devices to exchange short text messages.

SMS messages were defined in 1985 as part of the Global System for Mobile Communications (GSM) series of standards as a means of sending messages of up to 160 characters to and from GSM mobile handsets. Though most SMS messages are mobile-to-mobile text messages, support for the service has expanded to include other mobile technologies, such as ANSI CDMA networks and Digital AMPS as well as satellite and landline networks.

However, the present invention is not limited to such wireless interfaces and wireless networks and more, fewer and/or other wireless interfaces can be used to practice the invention.

Exemplary Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) and/or three-dimensional television (3DTV), including HDTV, the Internet 76, other networks 72, 74, 78, etc. that connect the network devices 12, 14, 16, 20, 22, 24, 26 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Television Services

In one embodiment, the cloud applications 30, 30' provide cloud geofencing services from television services over the cloud communications network 18. The television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the cloud applications 30, 30' provide cloud geofencing services from Internet television services over the cloud communications network 18. The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other mesh network device.

"Web-TV" delivers digital content via non-mesh broadband and mobile networks. The digital content is streamed to a viewer's set-top box, game console, computer, or other mesh network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

General Search Engine Services

In one embodiment, the cloud applications 30, 30' provide cloud geofencing services from general search engine services. A search engine is designed to search for information on a cloud communications network 18 such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the cloud applications 30, 30' provide cloud geofencing services from general search engine services. In another embodiment, the cloud applications 30, 30' provide general search engine services by interacting with one or more other public search engines (e.g., GOOGLE, BING, YAHOO, etc.) and/or private search engine services.

In another embodiment, the cloud applications 30, 30' provide geofencing services from specialized search engine services, such as vertical search engine services by interacting with one or more other public vertical search engines (e.g., GALAXY.COM, etc.) and/or private search engine services However, the present invention is not limited to such general and/or vertical search engine services and more, fewer and/or other general search engine services can be used to practice the invention.

Social Networking Services

In one embodiment, the cloud applications 30, 30' provide cloud geofencing services from one more social networking services including to/from one or more social networking web-sites (e.g., FACEBOOK, YOU-TUBE, TWITTER, MY-SPACE, etc.). The social networking web-sites also include, but are not limited to, social couponing sites, dating web-sites, blogs, RSS feeds, and other types of information web-sites in which messages can be left or posted for a variety of social activities.

However, the present invention is not limited to the social networking services described and other public and private social networking services can also be used to practice the invention.

Security and Encryption

Network devices 12, 14, 16, 20, 22, 24, 26 with wired and/or wireless interfaces of the present invention include one or more of the security and encryptions techniques discussed herein for secure communications on the cloud communications network 18.

Application programs 58 (FIG. 2) include security and/or encryption application programs integral to and/or separate from the cloud applications 30, 30' Security and/or encryption programs may also exist in hardware components on the network devices (12, 14, 16, 20, 22, 24, 26) described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the domain name "www.nist.gov/aes."

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the domain name See "netscape.com/eng/security/SSL_2.html."

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

However, the present invention is not limited to such security and encryption methods described herein and more, fewer and/or other types of security and encryption methods can be used to practice the invention. The security and encryption methods described herein can also be used in various combinations and/or in different layers of the protocol stack 38 with each other.

Cloud Computing Networks

Figure 4:
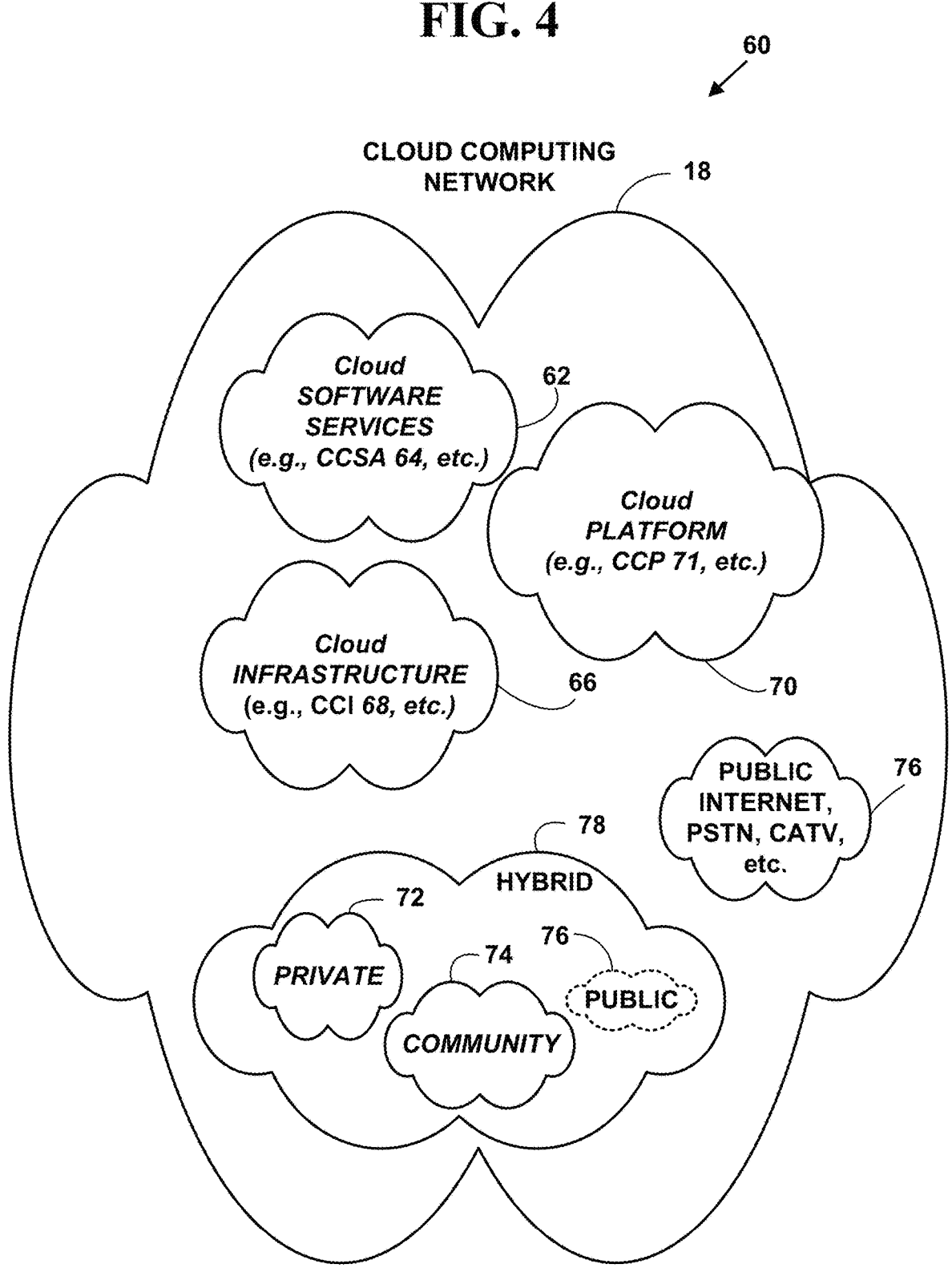
FIG. 4 is a block diagram illustrating an exemplary cloud computing network.

FIG. 4 is a block diagram 60 illustrating an exemplary cloud computing network 18. The cloud computing network 18 is also referred to as a "cloud communications network" 18. However, the present invention is not limited to this cloud computing model and other cloud computing models can also be used to practice the invention. The exemplary cloud communications network includes both wired and/or wireless components of public and private networks.

In one embodiment, the cloud computing network 18 includes a cloud communications network 18 comprising plural different cloud component networks 72, 74, 76, 78.

"Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

On-demand geofencing services. Geofence location services can unilaterally provision computing capabilities, such as server time and network storage, as needed automatically without requiring human interaction with each network server on the cloud communications network 18.
Broadband network access. Geofencing capabilities are available over plural broadband communications networks and accessed through standard mechanisms that promote use by heterogeneous thin or thick client platforms (e.g., mobile phones, smart phones 14, tablet computers 12, laptops, PDAs, etc.). The broadband network access includes high speed network access such as 3G and/or 4G wireless and/or wired and broadband and/or ultra-broad band (e.g., WiMAX, etc.) network access.
Resource pooling. Geofencing location service resources are pooled to serve multiple requesters using a multi-tenant model, with different physical and virtual resources dynamically assigned and reassigned according to geofencing location service demand. There is location independence in that a requester of electronic content has no control and/or knowledge over the exact location of the provided by the geofencing location service resources but may be able to specify location at a higher level of abstraction (e.g., country, state, or data center). Examples of pooled resources include storage, processing, memory, network bandwidth, virtual server network device and virtual target network devices.
Rapid elasticity. Capabilities can be rapidly and elastically provisioned, in some cases automatically, to quickly scale out and rapidly released to quickly scale for geofencing location services. To the electronic content storage and retrievers, the geofencing capabilities available for provisioning appear to be unlimited and can be used in any quantity at any time.
Measured Services. Cloud computing systems automatically control and optimize resource use by leveraging a metering capability at some level of abstraction appropriate to the type of geofencing location service (e.g., storage, processing, bandwidth, custom geofencing location applications, etc.). Geofencing location service usage is monitored, controlled, and reported providing transparency for both the electronic content provider and the electronic content requester of the utilized electronic content storage retrieval service.

Exemplary cloud computing service models illustrated in FIG. 4 appear in Table 2. However, the present invention is not limited to these service models and more, fewer or other service models can also be used to practice the invention.

TABLE 2

Cloud Computing Software Applications 62 for a Geofencing Location Service (CCSA 64). The capability to use the provider's applications 30, 30' running on a cloud infrastructure 66. The cloud computing applications 62, are accessible from the server network device 20 from various client devices 12, 14, 16 through a thin client interface such as a web browser, etc. The user does not manage or control the underlying cloud infrastructure 66 including network, servers, operating systems, storage, or even individual application 30, 30' capabilities, with the possible exception of limited user-specific application configuration settings.

TABLE 2-continued

Cloud Computing Infrastructure 66 for a Geofencing Location Service (CCI 68). The capability provided to the user is to provision processing, storage and retrieval, networks 18, 72, 74, 76, 78 and other fundamental computing resources where the consumer is able to deploy and run arbitrary software, which can include operating systems and applications 30, 30'. The user does not manage or control the underlying cloud infrastructure 66 but has control over operating systems, storage, deployed applications, and possibly limited control of select networking components (e.g., host firewalls, etc.).
Cloud Computing Platform 70 for the a Geofencing Location Service (CCP 71). The capability provided to the user to deploy onto the cloud infrastructure 66 created or acquired applications created using programming languages and tools supported servers 20, 22, 24, 26, etc.. The user not manage or control the underlying cloud infrastructure 66 including network, servers, operating systems, or storage, but has control over the deployed applications 30, 30' and possibly application hosting environment configurations.

Exemplary cloud computing deployment models appear in Table 3. However, the present invention is not limited to these deployment models and more, fewer or other deployment models can also be used to practice the invention.

TABLE 3

Private cloud network 72. The cloud network infrastructure is operated solely for a geofencing location services. It may be managed by the geofencing location service provider or a third party and may exist on premise or off premise.
Community cloud network 74. The cloud network infrastructure is shared by several different organizations and supports a specific geofencing location community that has shared concerns (e.g., mission, security requirements, policy, compliance considerations, etc.). It may be managed by the different organizations or a third party and may exist on premise or off premise.
Public cloud network 76. The cloud network infrastructure such as the Internet, PSTN, SATV, CATV, Internet TV, etc. is made available to the general public or a large industry group and is owned by one or more organizations selling cloud services.
Hybrid cloud network 78. The cloud network infrastructure 66 is a composition of two and/or more cloud networks 18 (e.g., private 72, community 74, and/or public 76, etc.) and/or two or more other types of public and/or private networks (e.g., intranets, etc.) that remain unique entities but are bound together by standardized or proprietary technology that enables data and application portability (e.g., cloud bursting for load-balancing between clouds, etc.)

Cloud software 64 for geofencing takes full advantage of the cloud paradigm by being service oriented with a focus on statelessness, low coupling, modularity, and semantic interoperability for electronic content retrieval. However, cloud software services 64 can include various states.

Cloud storage of desired electronic content on a cloud computing network includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application 30', offers cloud services for geofencing. The application 30, 30' offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 62 (SaaS) including a specific cloud software service 62 for geofence location services. The IaaS, PaaS and SaaS include one or more of cloud services 62 comprising networking, storage, server network device, virtualization, operating system, middleware, run-time, data and/or application services, or plural combinations thereof, on the cloud communications network 18.

Figure 5:
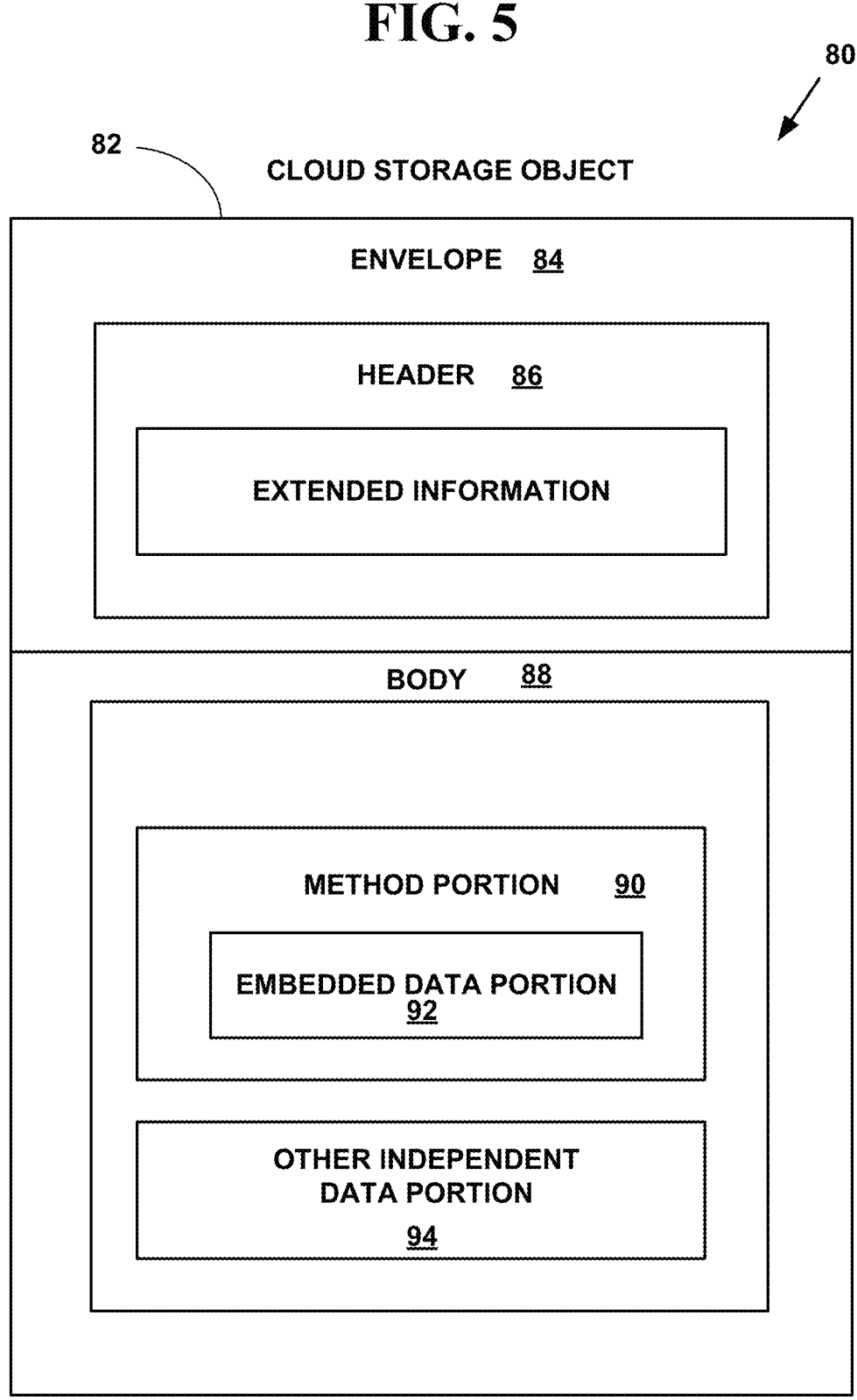
FIG. 5 is a block diagram illustrating an exemplary cloud storage object.

FIG. 5 is a block diagram 80 illustrating an exemplary cloud storage object 82.

The cloud storage object 82 includes an envelope portion 84, with a header portion 86, and a body portion 88. However, the present invention is not limited to such a cloud storage object 82 and other cloud storage objects and other cloud storage objects with more, fewer or other portions can also be used to practice the invention.

The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc.

The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions of desired electronic content across such networks 72, 74, 76, 78 of the cloud communications network 18. Cloud storage objects 82 includes one or more portions of desired electronic content and can be stored on any of the 72, 74, 76, 78 networks of the cloud communications network 18. Cloud storage objects 82 are transparent to a requester of desired electronic content and are managed by cloud applications 30, 30'.

In one embodiment, cloud storage objects 82 are configurable arbitrary objects with a size up to hundreds of terabytes, each accompanied by with a few kilobytes of metadata. Cloud objects are organized into and identified by a unique identifier unique across the whole cloud communications network 18. However, the present invention is not limited to the cloud storage objects described, and more fewer and other types of cloud storage objects can be used to practice the invention.

Cloud storage objects 82 present a single unified namespace or object-space and manages desired electronic content by user or administrator-defined policies storage and retrieval policies. Cloud storage objects includes Representational state transfer (REST), Simple Object Access Protocol (SOAP), Lightweight Directory Access Protocol (LDAP) and/or Application Programming Interface (API)

objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction.

Geofencinq

Figure 6:
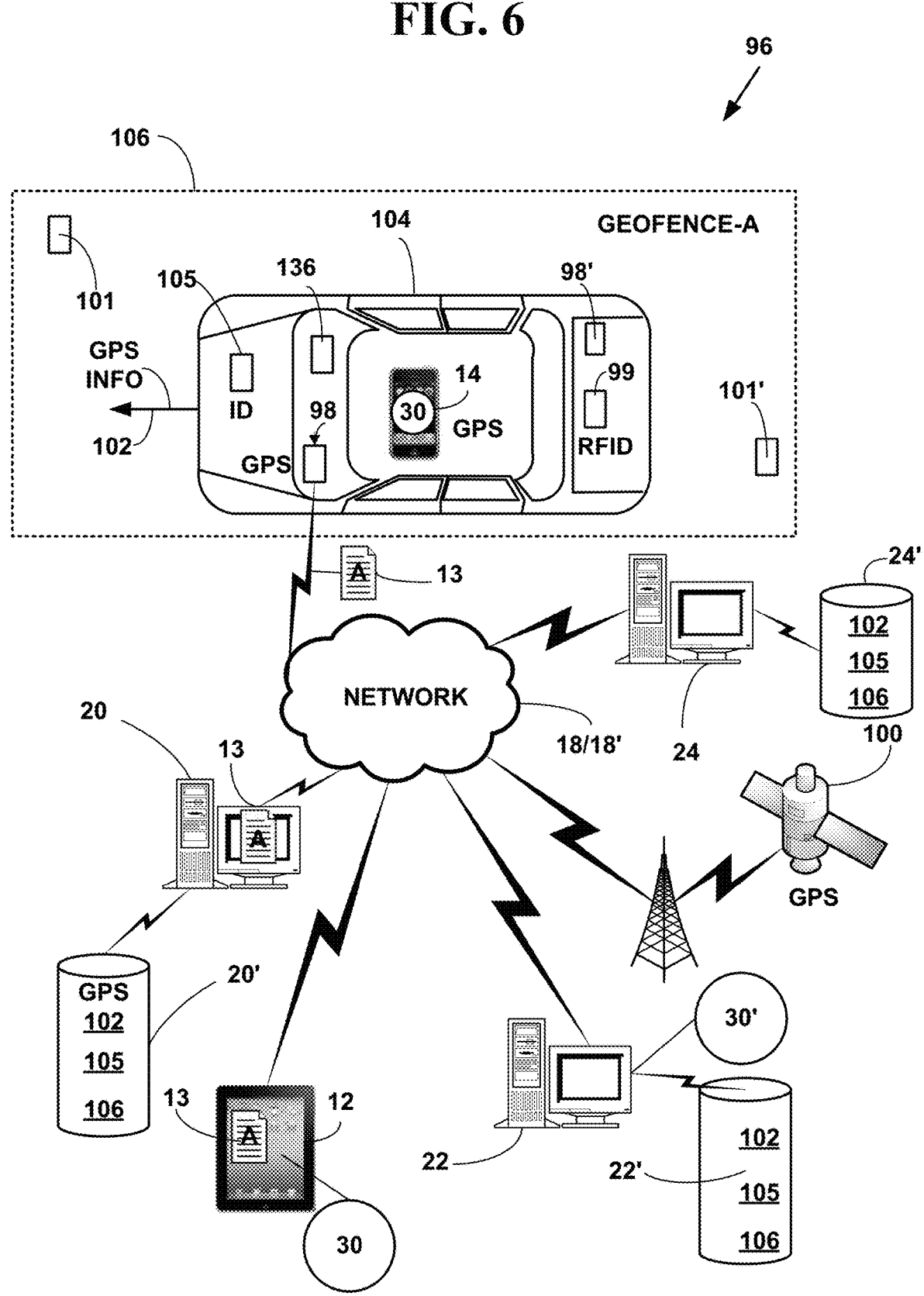
FIG. 6 is a block diagram illustrating an exemplary GPS geofencing system.

FIG. 6 is a block diagram illustrating an exemplary geofencing system;

The Global Positioning System (GPS) is a space-based global navigation satellite system (GNSS) that provides reliable location and time information in all weather and at all times and anywhere on or near the Earth. A GPS receiver 98 calculates its position by precisely timing signals sent by GPS satellites 100 (only one of which is illustrated). The GPS receiver 98 uses the messages it receives to determine a transit time of each message and computes a distance to each GPS satellite 100. These distances along with the satellites' locations are used with the possible aid of triangulation, depending on which algorithm is used, to compute a current physical position 102 of the GPS receiver 98 and hence a vehicle 104. This position is then displayed on an external device 12, 12', 14, 16, 20, 22, 24, 26, perhaps with a moving map display (e.g., at a street level, etc.) and/or latitude and longitude and/or elevation and/or speed and/or acceleration information may also be included. Many GPS units also show derived information such as travel direction and speed, calculated from position changes. The GPS coordinates include standard GPS, GPS map, Digital GPS (DGPS) and/or other types of GPS information.

The GPS interface 98 is used for "geo-fencing." A "geo-fence" 106 is a virtual perimeter for a real-world geographic area. A geo-fence 106 is dynamically generated—as in a radius around a store or point location. The geo-fence 106 is also statically defined as a predefined set of boundaries.

Figure 7B:
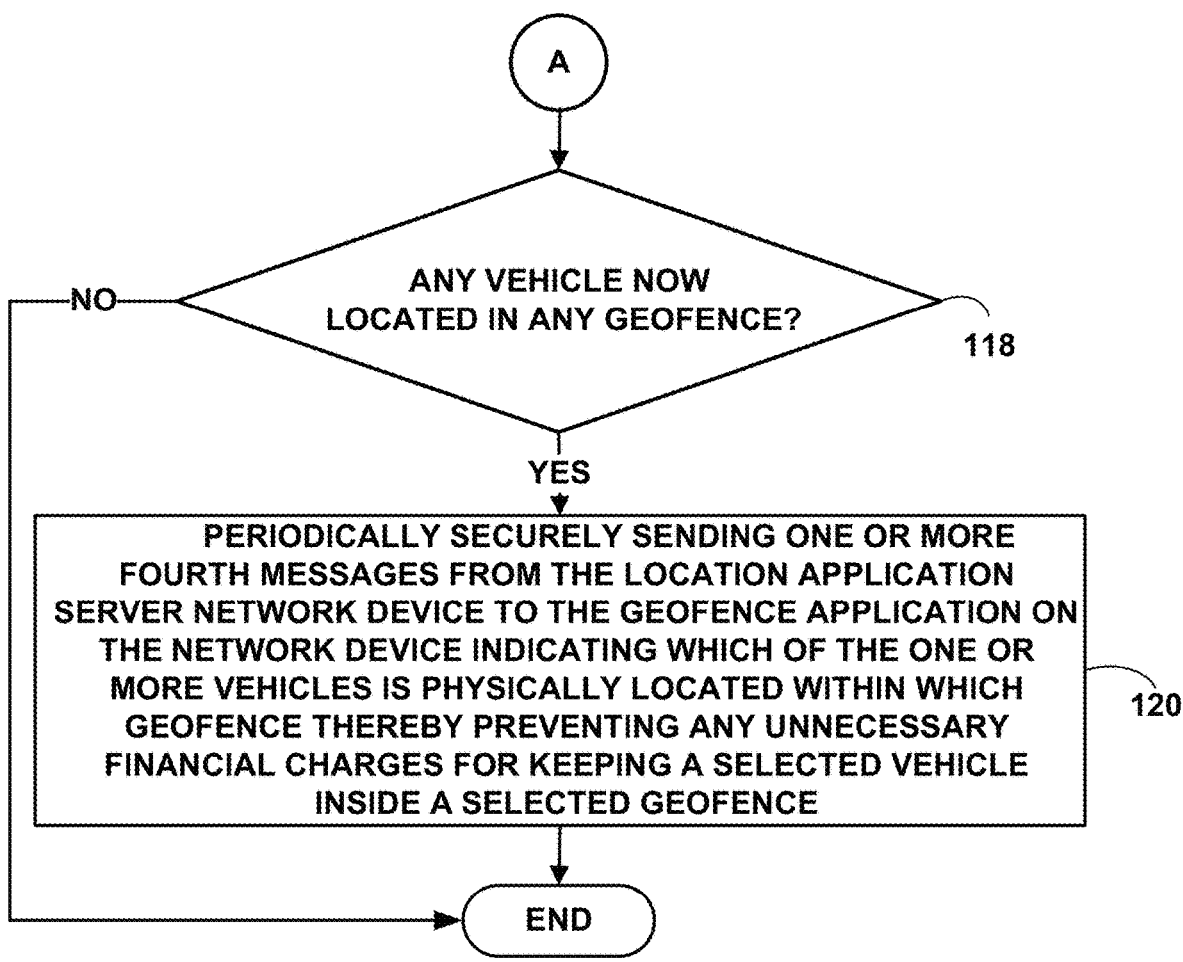

FIGS. 7A and 7B are a flow diagram illustrating a Method 108 for geofencing. In FIG. 7A at Step 110, one or more first messages are received on a location application on a server network device with one or more processors via a cloud communications network comprising one or more public, private, community or hybrid networks, from a geofence application on a network device with one or more processors. The one or more first messages include geofence information with coordinates for one or more geofences and one or more unique identifiers for one or more vehicles each with one or more processors. At Step 112, goefence information from the one or more first messages is stored with the location application on the server network device in one or more databases on the cloud communications network associated with the server network device. At Step 114, periodically the location application on the server network device securely sends one or more second messages to the one or more vehicles to determine a current location of the one or more vehicles and whether the one or more vehicle are not moving. At Step 116, one or more third messages are securely received on the location application on the server network device from any of the one or more vehicles including that are not moving including current location information for the one or more vehicles. In FIG. 7B at Step 118, determining from the location application on the server network device with the current location information from the one or more third messages and the geofence information stored in the one or more databases whether any of the vehicles that are not moving are physically located within any of the one or more geofences. If any of the vehicles are not moving, at Step 120, one or more fourth messages are securely sent from the location application on the server network device to the geofence application on the network device indicating which of the one or more vehicles is physically located within which geofence, thereby preventing any unnecessary financial charges for keeping a selected vehicle inside a selected geofence.

In one specific embodiment, Method 108 further includes additional Steps 120-A and 120-B. At Step 120-A the location application 30' on the server network device 20, 22, 24, 26 automatically records a cumulative time period duration with information from the one or more second messages and/or the one or more third messages and/or the one or databases 20', 22', 24', 26 and a cumulative financial charge for any vehicle 104 that is stationary and physically located in any geofence 106, thereby reducing and/or preventing any fraudulent financial charges for keeping any of the one or more vehicles 104 inside any of the one or more geofences 106. In one embodiment, daily charge rates for each geofence 106 are received at Step 110 and stored at Step 112. In such an embodiment, a cumulative financial charge total 135 is also calculated by the location application 30' on the server network device 20, 22, 24, 26. Thus cumulative financial charge 135 (e.g., $417, FIG. 10, etc.) can also be displayed during Step 120-B. This also helps to reduce and/or prevent fraudulent financial charges for keeping any of the one or more vehicles 104 inside any of the one or more geofences 106. However, the present invention is not limited to this additional calculation and the current invention can be practiced with and/or without these additional steps. At Step 120-B the location application 30' on the server network device 20, 22, 24, 26 sends the recorded time periods 133 (e.g., 2 days, 11 hours 11 minutes, FIG. 10, etc.) for the vehicles 104 to the geofence application 30 on the target network device 12, 14, 16 for display on the GUI 34 and/or on the graphical maps 128. However, the present invention is not limited to this specific embodiment and the current invention can be practiced with and/or without these additional steps.

Method 108 is illustrated with an exemplary embodiment. The present invention is not limited to this exemplary embodiment and other embodiments can be used to practice the invention.

In such an exemplary embodiment at FIG. 7A at Step 110, one or more first messages are received on a location application 30' on a server network device 20, 22, 24, 26 with one or more processors via a cloud communications network 18 comprising one or more public 76, private 72, community 74 and/or hybrid networks 78, from a geofence application 30/30' on a network device 12, 14, 16, 20, 22, 24, 26 with one or more processors. The one or more first messages include coordinates for one or more geofences 106 and one or more unique identifiers 105 for one or more vehicles 104 each with one or more processors. The network device includes one or more target network devices 12, 14, 16, and/or or more server network devices 20, 22, 24, 26, and/or one or more other types of network devices, each with one or more processors.

In one embodiment, the unique identifiers 105 for the vehicles 104 include, but are not limited to, Uniform Resource Identifiers (URIs) and/or Uniform Resource Names (URNs), and/or Uniform Resource Locators (URLs) unique across the cloud communications network 18, and/or vehicle license numbers, vehicle identification numbers (VINs) and/or other unique vehicles identifiers. However, the present invention is not limited to these unique identifiers and other unique identifiers can also be used to practice the invention.

In one embodiment, the one or more vehicles 104, include, but are not limited to, cars, trucks, boats, snow machines, bicycles, motorcycles, construction vehicles, etc. In another embodiment, invention further includes, non-vehicle entities, such as sports equipment, tools, etc. However, the present invention is not limited to such embodiments and other embodiments can be used to practice the invention.

In one embodiment, the one or more geofences 106 include geofences 106 for car dealers, finance companies, towing companies, repossession companies, law enforcement entities, military entities, government agency entities and/or other entities. However, the present invention is not limited to such embodiments and other embodiments can be used to practice the invention.

In one embodiment, network devices 12, 14, 16, 20, 22, 24, 26 include and the one or more vehicles 104 include one or more wireless communications interface comprising: cellular telephone, 802.11a, 802.11b, 802.11g, 802.11n, 802.15.4 (ZigBee), "Wireless Fidelity" (Wi-Fi), Wi-Fi Aware, "Worldwide Interoperability for Microwave Access" (WiMAX), ETSI High Performance Radio Metropolitan Area Network (HIPERMAN), Near Field Communications (NFC), Machine-to-Machine (M2M), Bluetooth or infra data association (IrDA) wireless communication interfaces. However, the present invention is not limited to such embodiments and other embodiments can be used to practice the invention.

In one embodiment, when a vehicle 104 is collected (e.g., via a repossession, tow, etc.) a non-integral and/or non-on-board and/or portable Global Positioning System (GPS) apparatus 98', and/or a portable vehicle on-board diagnostics (OBD) apparatus, OBD-2 apparatus 136 (FIGS. 11-13) and/or a radio frequency identifier (RFID) tag/sensor 99 and/or a target network device 12, 14, 16 with geofence application 30 and/or GPS functionality is added to the vehicle 104 to allow it to be more easily tracked as it enters a geofence 106. In another embodiment, the collected vehicle 104 already has such communications components included in and/or on and/or integral to the vehicle 104. Such additional devices and/or communication components include their own power sources that allow the additional devices and/or communications components to continue to communicate with the cloud communications network 18 and/or other communications network 18' when an ignition of the vehicle 104 is off. However, the present invention is not limited to such an embodiment and other embodiments may be used to practice the invention.

In another embodiment, one or more of the vehicles 104 include the geofence application 30 and/or location application 30', acting as either a target network device and/or a server network device. In such an embodiment, the vehicle 104 and applications 30/30' have access to their own power sources that allow the vehicle and applications 30/30' to continue to communicate with the cloud communications network 18 and/or other communications network 18' when an ignition of the vehicle 104 is off. However, the present invention is not limited to such an embodiment and other embodiments may be used to practice the invention.

In another embodiment, another vehicle (e.g., a tow vehicle, etc.) used to collect the vehicle 104 includes a target network device 12, 14, 16 with geofence application 30 and and/or GPS functionality to allow it to be more easily tracked as the vehicle 104 it is moving/towing etc. enters a geofence 106. However, the present invention is not limited to these embodiments and can be practiced with and/or without the additional communications components added to the desired vehicle 104 or additional communications components or network devices to a tow vehicle, etc.

In one embodiment the geofence 106 coordinates include at least four pieces of location information defining four corners of a geofence boundary 106. However, the present invention is not limited to such an embodiment and more or fewer pieces of location information can be used to practice the invention. For example, a given geofence 106 may have an irregular boundary (i.e., not a square, rectangule, etc.) and require more pieces (e.g., more for polygon, etc.) of location information to define the geofence boundary 106.

In one embodiment, the geofence 106 coordinates include GPS coordinates 102 (e.g., longitude and latitude, etc.). However, the present invention is not limited to such an embodiment and other embodiments can be used to practice the invention.

In another embodiment, the coordinates include, two-dimensional geo-space (X,Y) information, three-dimensional (X,Y,Z) geo-space information, two or more street names, or latitude and longitude coordinates with and/or without elevation information. However, the present invention is not limited to such an embodiment and other embodiments can be used to practice the invention.

In one embodiment, the one or more geofences 106 include geofences 106 for impound yards, parking lots, parking garages with and/or without fenced perimeters and/or other security features for vehicles 104 that have been towed away at the request of a civil party (e.g., car dealer, finance company, etc.), law enforcement, military, government agency, etc. However, the present invention is not limited to such an embodiment and other embodiments can be used to practice the invention.

At Step 112, geofence information including, but not limited to, the geofence coordinates and the unique identifiers of the one or more vehicles associated with the one or more geofences from the one or more first messages is stored with the location application 30 on the server network device 20, 22, 24, 26 in one or more databases 20', 22', 24', 26' on the cloud communications network 18 associated with the server network device 20, 22, 24, 26.

In one embodiment, the one or more second messages or information included therein are stored in one or more cloud storage objects 82 in one or databases 20', 22', 24', 26' in one or more locations and/or on one or more different networks 72, 74, 76, 78 on the cloud communications network 18. However, the present invention is not limited to such an embodiment, and the invention can be practiced with and/or without using cloud storage objects 82 and the information may also be stored in non-cloud storage.

At Step 114, periodically the location application 30' on the server network device 20, 22, 24, 26 securely sends one or more second messages to the one or more vehicles 104 to determine a current location of the one or more vehicles 104 and whether the one or more vehicles 104 are not moving.

In one embodiment, Step 114 includes securely sending the one or more second messages periodically based on a first pre-determined time period.

In one embodiment, the first pre-determined time period is two minutes. However, the present invention is not limited to such an embodiment and other embodiments, with shorter or longer pre-determined time periods can be used to practice the invention.

In such an embodiment, a current location-X 131 of the vehicle 104 can be tracked in real-time (i.e., within a few seconds, etc.), and it current and historical movement displayed on a graphical map 128. Thus, if vehicle was required to be immediately located, current location information for the vehicle 104 is at the most two minutes old. However, the present invention is not limited to such an embodiment and other embodiments may be used to practice the invention.

In one embodiment, the one or more second messages are periodically sent via the first pre-determined time period whenever a vehicle 104 is still in motion. The vehicle 104 may be in motion because the vehicle has its ignition on and is being driven and/or the vehicle is being towed (e.g., pushed, pulled, transported on another vehicle, etc.). In such an embodiment, a communication component in the vehicle (e.g., 30, 12, 14, 16 with 30, 30', 98, 98', 136, etc.) is either using a power source from the vehicle 106 or its own internal power source to receive and send location information. However, the present invention is not limited to such an embodiment and other embodiments may be used to practice the invention.

At Step 114, the one or more second messages are periodically and securely sent using any of the security and/or encryption methods described herein to prevent hacking and/or tampering with the one or more second messages on the cloud communications network 18 by third-parties.

At Step 116, one or more third messages are securely received on the location application 30' on the server network device 20, 22, 24, 26 from any of the one or more vehicles 104 including that are not moving including current location information for the one or more vehicles.

At Step 116, the one or more third messages are periodically and securely received using any of the security and/or encryption methods described herein to prevent hacking and/or tampering with the one or more third messages on the cloud communications network 18 by third-parties.

In one embodiment, information from the one or more third messages are stored by the location application 30' on the server network device 20, 22, 24, 26 in the one or more databases 20', 22', 24', 26' in one or more cloud storage objects 82 and/or in one or more non-cloud storage objects on the cloud communications network 18. In such an embodiment, the stored location information provides current and historical movement of vehicles 104 that can be used displayed in real-time or non-real-time on a graphical map 128.

In one embodiment, the one or more third messages are sent by a GPS receiver 98 in the vehicle 104. The GPS receiver 98 may be integral to and/or an add-on 98' component to the vehicle 104. However, the present invention is not limited to these embodiments, and other embodiments can be used to practice the invention.

In another embodiment, the one or more third messages are securely sent by a GPS component via a GPS, cellular, geofence application 30, and/or other application in a first target network device 12, 14, 16, included in the vehicle 104. However, the present invention is not limited to these embodiments, and other embodiments can be used to practice the invention.

In another embodiment, the one or more third messages are securely sent by a location application 30' in one or more communications components 101, 101' (e.g., GPS, cellular, 802.11x, Wi-Fi, Wi-Fi Aware, NFC, M2M, etc.) each with one or more processors located within a geofence 106. In such an embodiment, the vehicle 104 automatically triggers sending of the one or more third messages when the vehicle 104 enters (e.g., is driven in, is towed in, etc.) a given geofence 106. However, the present invention is not limited to such an embodiment and other embodiments can be used to practice the invention.

In one embodiment, Step 116 includes securely receiving the one or more third messages including one or more messages generated by one or more wireless Global Positioning System (GPS) signals, Wireless Fidelity (Wi-Fi) signals, Wi-Fi Aware signals, Bluetooth signals, near field communications (NFC) signal, machine-to-machine (M2M) communications signal, radio frequency identifier (RFID) signal, or cell tower signals being sent from the one or more vehicles. However, the present invention is not limited to these embodiments, and other embodiments can be used to practice the invention.

In another embodiment, the one or more third messages 13/15 are securely sent from a specific vehicle 104 when the specific vehicle 104 has stopped all motion and is stationary and whose ignition is off, and has crossed a specific geofence 106 boundary. In such an embodiment, a vehicle application 30 on the vehicle 104 are in communications with a communication component (e.g., GPS 98', etc.) added to the vehicle 104 has its own power source and only securely sends the one or more third messages when the ignition turn off event and the no additional motion are detected. The one or more third messages 13/15 are then sent. However, the present invention is not limited to such messages and other messages can be used to practice the invention.

In FIG. 7B at Step 118, the location application 30' on the server network device 20, 22, 24, 26 determines with the current location information from the one or more third messages and the geofence location information stored in the one or more database whether any of the vehicles 104 that are not moving are physically located within any of the one or more geofences 106.

In one embodiment, at Step 118, the location application 30' on the server network device 20, 22, 24, 26 compares current location information 102 for the one or more vehicles 104 to location information for the one or more geofences 106 stored in the cloud storage objects in the one or more databases 20', 22', 24', 26' on the cloud communications network 18.

For example, a current location for a selected vehicle 104 may include GPS information 102 comprising Latitude:N 33° 28' 8.3493" Longitude:W 117° 40' 24.2016" Latitude:N 33° 28.139155' Longitude:W 117° 40.403359' for a selected geofence defined by Latitude:N 33° 28' 8.3492" Longitude:W 117° 40' 24.2015" Latitude:N 33° 28.139156' Longitude:W 117° 40.403360'. Using such GPS information 102, the location application 30' on the server network device 20, 22, 24, 26, is able to determine that selected vehicle 104 is within geofence 106. However, the present invention is not limited to such messages and other messages can be used to practice the invention.

In another example, a current location for a selected vehicle 104 may include location information comprising 3D geo-space coordinates (111, 253, 617), (112, 245, 617), (113, 246, 618) (114, 247, 619) for a geofence 106 defined by 3D geo-space coordinates (111, 253, 617), (122, 255, 627), (123, 256, 628) (124, 257, 629). However, the present invention is not limited to such messages and other messages can be used to practice the invention.

If any of the vehicles 104 are not moving and located with any geofence 106, at Step 120, one or more fourth messages are securely sent from the location application 30' on the server network device 20, 22, 24, 26 to the geofence application 30/30' on the network device 12, 14, 16, 20, 22, 24, 26 indicating which of the one or more vehicles 104 is physically located within which geofence 106, thereby preventing any unnecessary financial charges for keeping a selected vehicle 104 inside a selected geofence 106.

When an owner of a vehicle 104 is notified at Step 120, the owner can immediately proceed themselves or send a third-party to the geofences 106 (e.g., impound yard, etc.) to collect the vehicles 104 to avoid additional finance charges.

In one embodiment, the one or more fourth messages 13/15 includes one or more audio messages, video messages, voice messages, SMS messages (i.e., text message), instant messages, e-mail messages, social media messages, (e.g., tweet, post, etc.), multi-media messages (e.g., still picture, video, etc.) or other type of messages. The multi-media messages includes time-stamped messages. However, the present invention is not limited to such messages and other messages can be used to practice the invention.

At Step 120, the one or more fourth messages are periodically and securely sent using any of the security and/or encryption methods described herein to prevent hacking and/or tampering with the one or more fourth messages on the cloud communications network 18 by third-parties.

The one or more four messages 13/15 allows a user of the network device 12, 14, 16, 20, 22, 24, 26 to immediately determine that the vehicle 104 has been moved and/or towed to an impound yard inside a geofence 106. Such impound yards typically charge a daily fee and the one or more fourth message allows the user of the device 12, 14, 16, 20, 22, 24, 26 know immediately when their vehicle crosses the geofence 106 for the impound yard, so it can be timely removed without incurring a large amount of daily impound fees. However, the present invention is not limited to such messages and other messages can be used to practice the invention.

In one embodiment, the one or more fourth messages 13/15 further include information to display on a graphical map 128 on the geofence target application 30 on the target network device 12, 14, 16, or a location application 30' on a server network device 20, 22, 24, 26 indicating a current geographical location of the vehicle 104. However, the present invention is not limited to such and embodiment and other embodiments may be used to practice the invention.

In one embodiment, at Step 120, the location application 30 on the server network devices 20, 22, 24, 26 periodically securely sends the one or more fourth messages based a second pre-determined time period to the geofence application 30/30' on the network device 12, 14, 16, 20, 22, 24, 26 until all of the one or more vehicles 104 physically located within all of the geofences 106 are physical removed from all of the geofences 106, thereby preventing unnecessary cumulative financial charges. However, the present invention is not limited to such messages and other messages can be used to practice the invention.

In one embodiment, Step 120 includes securely sending the one or more fourth messages periodically based on a second pre-determined time period.

In one embodiment, the second pre-determined time period is a four hour time period. However, the present invention is not limited to such an embodiment and other embodiments, with shorter or longer pre-determined time periods can be used to practice the invention.

In one embodiment, the one or more fourth messages are periodically with sent the second pre-determined time period whenever a vehicle 104 has stop moving and is stationary. The vehicle 104 is stationary because the vehicle has its ignition off and/or is no longer being driven and/or the vehicle is no longer being towed (e.g., pushed, pulled, transported on another vehicle, etc.). In such an embodiment, a communication component in the vehicle (e.g., 30, 12, 14, 16 with 30, 30', 98, 98', 136, etc.) is either using a power source from the vehicle 104 that is still usable when the vehicle's 104 ignition is off and/or its own power source that still is operational when the an ignition of the vehicle 104 is off, to receive and send location information to the location application 30' on the server network device 20, 22, 24, 26. However, the present invention is not limited to such an embodiment and other embodiments may be used to practice the invention.

In such an embodiment, the second pre-determined time period is long enough not to overwhelm the network device 12, 14, 16, 20, 22, 24, 26 but at the same time keep the network device 12, 14, 16, 20, 22, 24, 26 aware that one or more vehicles 104 are still physically located within a geofence 106 incurring financial charges. However, the present invention is not limited to such an embodiment and other embodiments, with shorter or longer pre-determined time periods can be used to practice the invention.

FIG. 8 is a flow diagram illustrating a Method 119 for geofencing.

Figure 9:
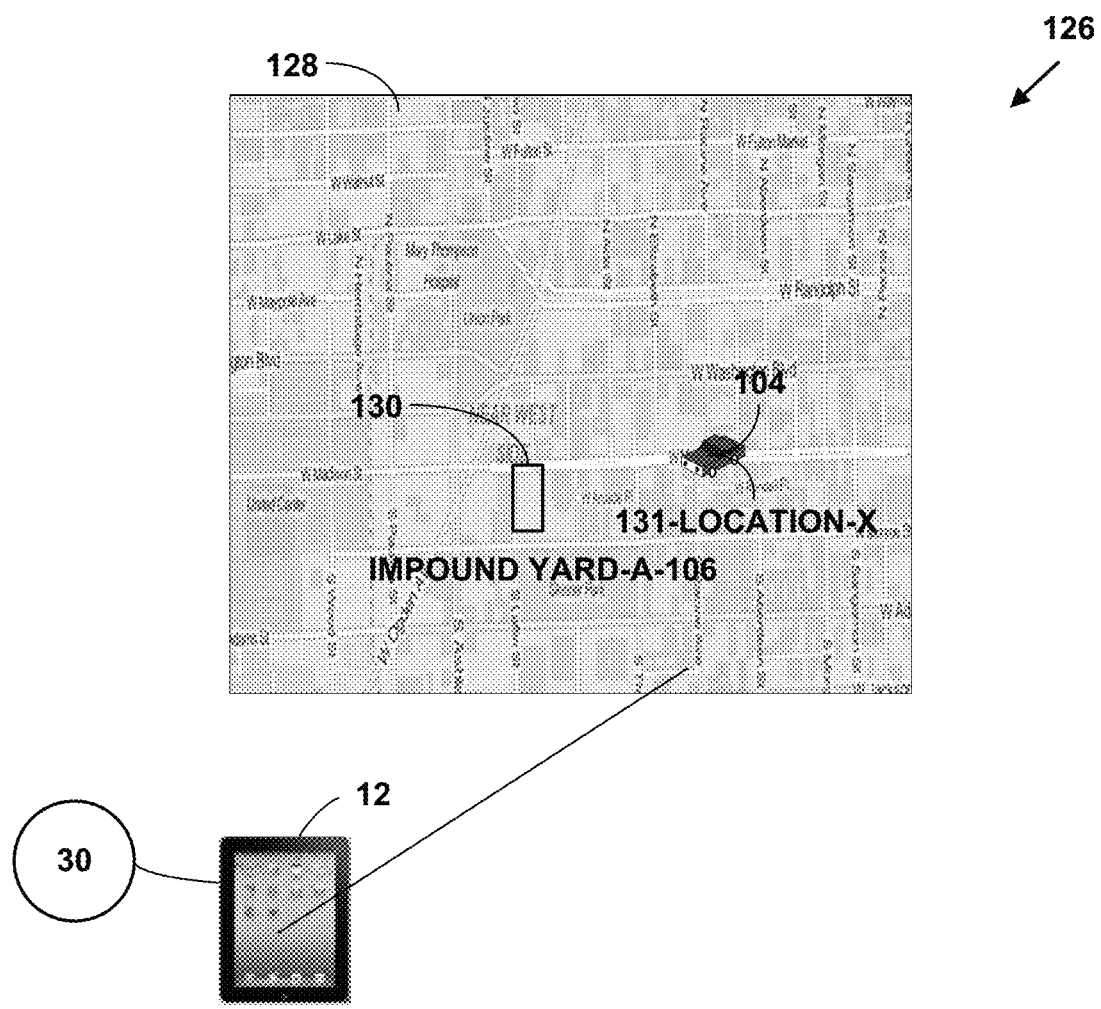
FIG. 9 is a block diagram illustrating geofencing.

FIG. 9 is a block diagram 126 illustrating geofencing.

Figure 10:
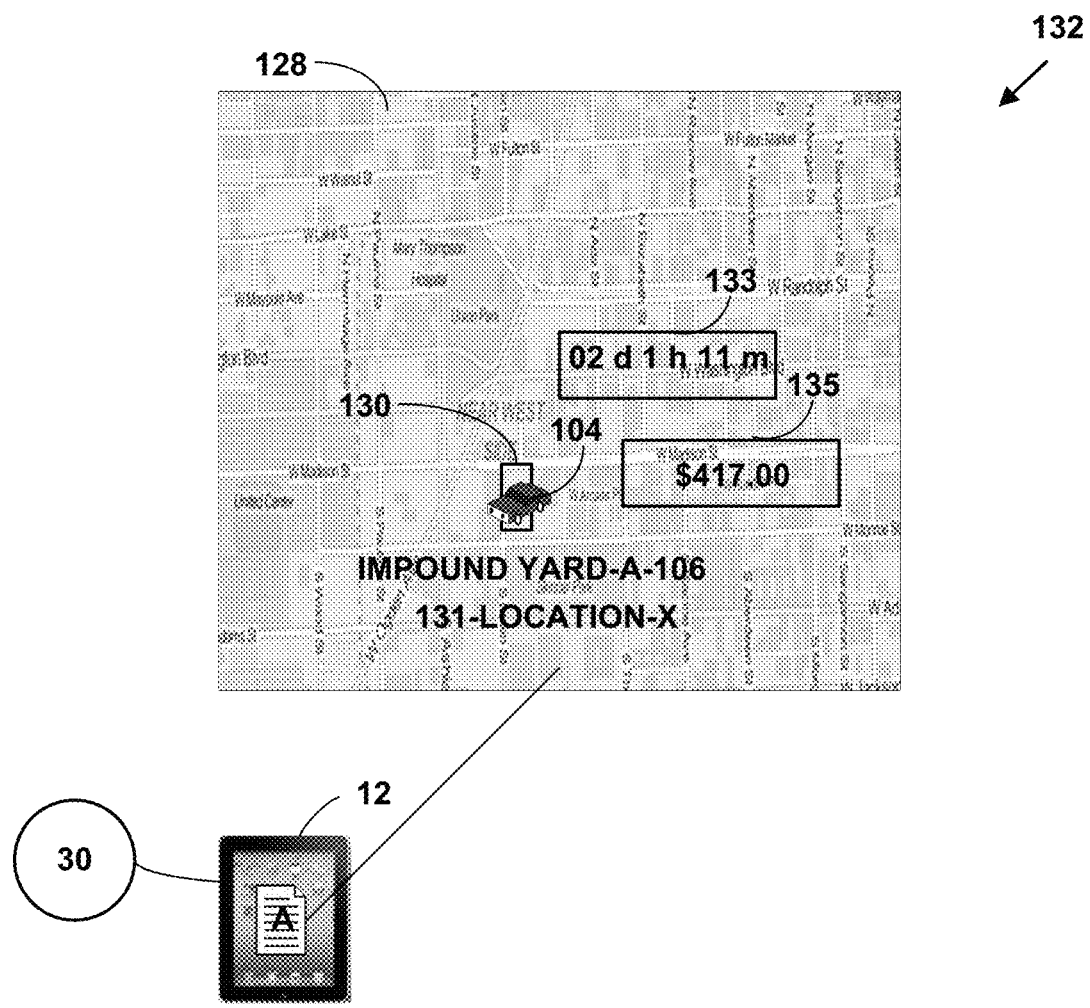
FIG. 10 is a block diagram illustrating geofencing.

FIG. 10 is a block diagram 132 illustrating geofencing.

In FIG. 8, at Step 121, a geofence application on a target network device with one or more processors defines one or more geofences via a graphical user interface (GUI) on a graphical map. At Step 123, the geofence application on the target network device associates one or more vehicles with the defined one or more geofences via the GUI. At Step 125, one or more new geofence messages are sent from the geofence application on the target network device to the location application on the server network device via the communications network including geofence and vehicle information. At Step 127, the geofence application on the target network device securely receives one or more new geofence messages when any of the one or more vehicles is stationary and physically located any of the one or more defined geofences.

Method 119 is illustrated with an exemplary embodiment. The present invention is not limited to this exemplary embodiment and other embodiments can be used to practice the invention.

In such an exemplary embodiment at Step 121, a geofence application 30 on a target network device 12, 14, 16 with one or more processors defines 130 one or more geofences 106 via a graphical user interface (GUI) 34 on a graphical map 128.

In embodiment, the GUI 34 displays graphical maps 128. In such an embodiment, a user is able to select with an input device (e.g., mouse, keyboard, finger, stylus, etc.) a geographical boundary 130 for a geofence 106. The geographical boundary includes GPS 102 (e.g., longitude, latitude, etc.) and/or other types of coordinates. In another embodiment the GUI 34 accepts GPS 102 coordinates as electronic text. However, the present invention is not limited to GPS coordinates 102 and other types of coordinates and/or geographical boundaries can be used to practice the invention.

In one embodiment, a user of the target network device 12, 14, 16, is able to graphically draw a shape 130 (e.g., circle, square, rectangle, etc.) around a desired geographical boundary 130 for a geofence 106 via GUI 34.

In one embodiment, the geofence 106 may be larger than the boundary of the impound lot 130 (e.g., may include streets, surrounding the impound lot 104, etc.) so the target network device 12, 14, 16 or server network device 20, 22, 24, 26 is notified when a vehicle accesses streets around the impound lot 130.

At Step 123, the geofence application 30 on the target network device 12, 14, 16 associates one or more vehicles 102 with the defined one or more geofences 106 via the GUI 34.

In one embodiment at Step 123, the geofence application 30 on the target network device 12 displays a graphical map 128 (FIG. 9) that allows a user to graphically associate (e.g., draw a box around, etc.) the geofence 106 on the map 128 for an impound lot 130. However, the present invention is not limited to such an invention and the invention can be practiced without or without the graphical map 128 (e.g., by entering geofence 106 coordinates by electronic text, etc.).

Returning to FIG. 8 at Step 125, one or more new geofence messages are securely sent from the geofence application 30 on the target network device 12, 14, 16 to the location application 30' on the server network device 20, 22, 24 via the communications network 18 including geofence 106 and vehicle 104 information.

In one embodiment, the one or more new geofence messages securely sent at Step 125 include daily charges for each geofence 106. In such an embodiment, a cumulative financial charge 135 total for each vehicle 104 in each geofence 106 could also be calculated by the location application 30' on the server network device 20, 22, 24, 26 as was discussed above for Method 108 to avoid fraudulent financial charges. However, the present invention is not limited to such an embodiment and other embodiments can be used to practice the invention.

At Step 127, the geofence application 30 on the target network device 12, 14, 16, securely receives one or more new geofences messages 13/15 when any of the one or more vehicles 104 is stationary and physically located in any of the one or more defined geofences 106, 130.

In one embodiment, the message 13/15 received at Step 127, further includes additional vehicle 104 information to display on a graphical map 128 (FIG. 10) on the target application 30 on the target network device 12, 14, 16, indicating a current geographical location of the vehicle 104 (e.g., has arrived in impound yard 130 with geofence 106, etc.) However, the present invention is not limited to such and embodiment and other embodiments may be used to practice the invention.

In one embodiment, an on-board diagnostics (OBD) apparatus already exists on or is added to a desired vehicle 104 when it is collected.

On-board diagnostics (OBD) is an automotive term referring to a vehicle's self-diagnostic and reporting capability. OBD systems give the vehicle owner or repair technician access to the status of the various vehicle subsystems. The amount of diagnostic information available via OBD has varied widely since its introduction in the early 1980s versions of on-board vehicle computers. Early versions of OBD would simply illuminate a malfunction indicator light if a problem was detected but would not provide any information as to the nature of the problem. Modern OBD implementations use a standardized digital communications port to provide real-time data in addition to a standardized series of diagnostic trouble codes, or DTCs, which allow one to rapidly identify and remedy malfunctions within the vehicle.

OBD-2 is an improvement over OBD in both capability and standardization. The OBD-2 standard specifies the type of diagnostic connector and its pinout, the electrical signaling protocols available, and the messaging format. It also provides a candidate list of vehicle parameters to monitor along with how to encode the data for each.

Figure 11:
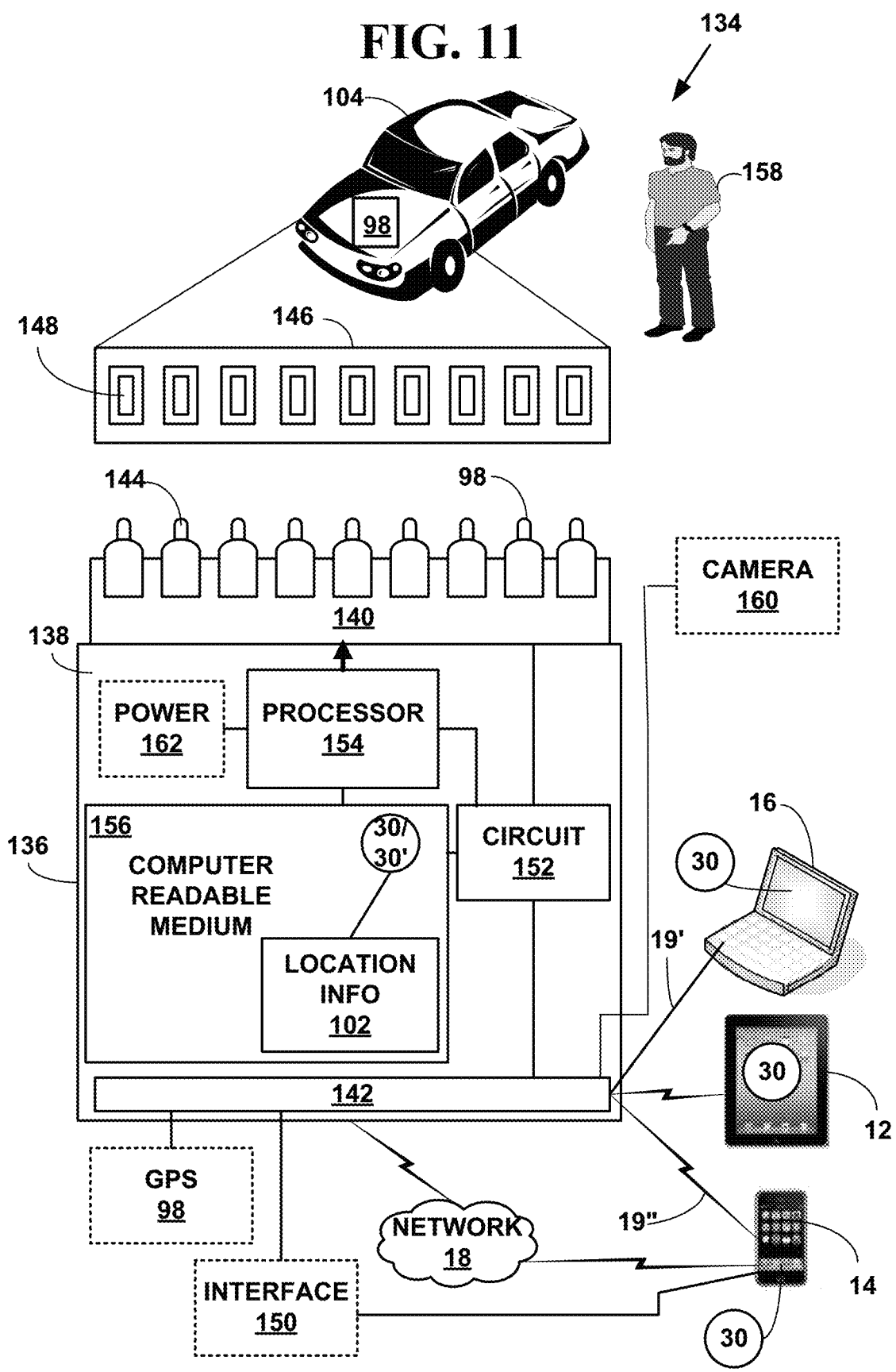
FIG. 11 is a block diagram illustrating a portable vehicle on-board diagnostics (OBD-2) apparatus.

FIG. 11 is a block diagram 134 illustrating a portable vehicle on-board diagnostics (OBD-2) apparatus 136.

Figure 12:
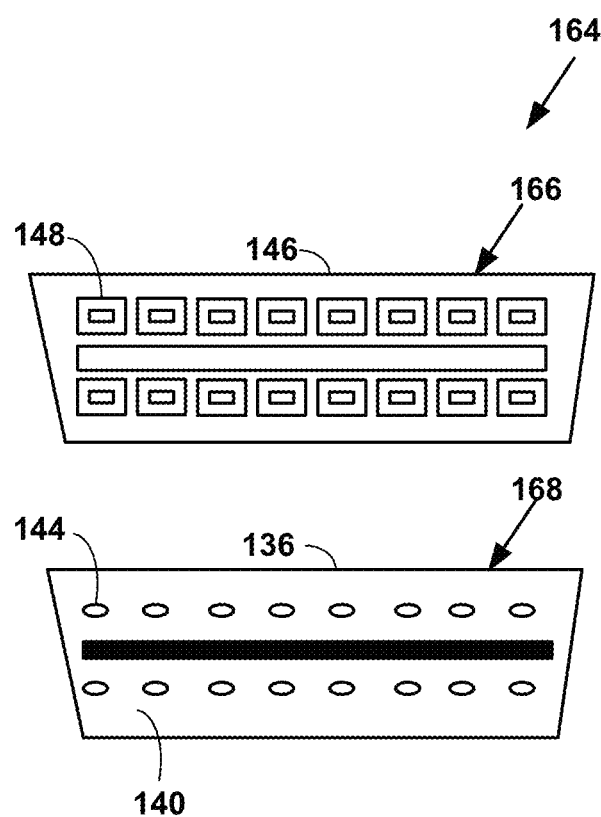
FIG. 12 is a block diagram illustrating a side view of the portable vehicle on-board diagnostics (OBD-2) apparatus of FIG. 11.

FIG. 12 is a block diagram 164 illustrating another view of the portable vehicle on-board diagnostics (OBD-2) apparatus 136 of FIG. 11. FIG. 12 is not drawn to scale and is illustrative only of a one exemplary shape of an OBD-2 apparatus 136.

In FIG. 11, the OBD-2 apparatus 136 comprises a case component 138, including a first side comprising a male connector 140 and a second side of the case component including a second connector 142. The male connector 140 includes plural pins 144 for connecting to a female on-board diagnostic series 2 (OBD-2) port 146 integral to a vehicle 104 with plural electronic receptacles 148 for receiving the plural pins 144 from the male connector 140. The shape and size of the plural pin male connectors 144 in the drawing in FIG. 11 is exemplary only and for simplicity and does not illustrated all sixteen pins required for an OBD-2 connector. The female OBD-2 port 146 also does not include all sixteen receptacles 148 required for an OBD-2 receptacle.

FIG. 12 illustrates a side view of OBD-2apparatus 136. FIG. 12 illustrated further details 166 of the female on-board diagnostic series 2 (OBD-2) port 146 integral to a vehicle 104 with 16 electronic receptacles 148. FIG. 12 also illustrates further details 168 of the male connector 140 including 16 pins 144 of the OBD-2apparatus 136 of FIG. 11.

Table 4 illustrates a few standard pins 144 defined for OBD-2. However, the present invention is not limited to this pin layouts and other signals can be used to practice the invention.

TABLE 4

| Pin Receptacle 146 | Signal | Description |
| --- | --- | --- |
| 2 | J1850 Bus+ | |
| 4 | CGND | GND |
| 5 | SGND | GND |
| 6 | CAN High | J-2284 |
| 7 | ISO 9141-2 K-LINE | Tx/Rx |
| 8 | GPS | GPS |
| 10 | J1850 Bus- | |
| 14 | CAN Low | J-2284 |

TABLE 4-continued

| Pin Receptacle 146 | Signal | Description |
|---|---|---|
| 15 | ISO 9141-2 L-LINE | Tx/Rx |
| 16 | +12 v | Battery power |

A Controller Area Network (CAN) bus is used in most cars since 2004. The CAN protocol is a popular standard outside of the automotive industry and is making significant in-roads into the OBD-2 market share. By 200 8, all vehicles sold in the US were required to implement the CAN bus, thus eliminating the ambiguity of the existing five signaling protocols.

The CAN bus is simply a pair of wires, often twisted around each other, running around the vehicle and terminated at either end of the two-wire network with resistors of 120 Ohms. The only components connected to the CAN bus are the electronic control units (nodes). Other components, such as sensors, motors, light bulbs, switches, etc. are wired only to the electronic control units. Some vehicles have a CAN bus system along side the ISO/KWP2000 system. A vehicle which uses CAN bus for on-board diagnostics can only respond to an OBD-2 request from a tester which uses CAN bus. From model year 2008 vehicle manufacturers must use the OBD protocol specified in ISO 15765, also known as Diagnostics On CAN.

Two wires of CAN bus, CAN-H and CAN-L, will have the same voltage when idle (about 2.5V), or a voltage difference of 2V when a signal is placed on the CAN bus. When a signal is placed on the CAN bus the CAN-H line is at a higher voltage than the CAN-L line. Each electronic control unit have its own CAN identity code, like an address (may respond to several CAN id codes). If an electronic control unit is to communicate to another it will need to know the CAN identity code of the recipient.

A simple check to see if the CAN bus is in use in a vehicle, and accessible via the OBD socket, is to connect a resistance meter across pin 6 and pin 14. Due to the combined resistance of the two termination resistors at 120 Ohms each the overall resistance should be read as 60 Ohms.

OBD-2 provides access to numerous other data from the Engine Control Unit (ECU) and offers a valuable source of information when troubleshooting problems inside a vehicle. The Society of Automotive Engineers (SAE) J1979 standard defines a method for requesting various diagnostic data and a list of standard parameters that are available from the ECU and other devices 32 in the vehicle 24. The various parameters that are available are addressed by parameter identification numbers or Parameter IDentifiers (PIDs), which are defined in SAE J1979, which is incorporated herein by reference.

OBD-2 PIDs (On-board diagnostics Parameter IDs) are codes used to request data from a vehicle, used as a diagnostic tool. SAE standard J/1979 defines many PIDs, but manufacturers also define many more PIDs specific to their vehicles. All light duty vehicles (i.e. less than 8,500 pounds) sold in North America since 1996, as well as medium duty vehicles (i.e. 8,500-14,000 pounds) beginning in 2005, and heavy duty vehicles (i.e. greater than 14,000 pounds) beginning in 2010, were required to support OBD-2 diagnostics, using a standardized data link connector, and a subset of the SAE J/1979 defined PIDs (or SAE J/1939 as applicable for medium/heavy duty vehicles), primarily for state mandated emissions inspections.

Typically, an automotive technician uses PIDs with a scan tool connected to the vehicle's OBD-2 connector. The technician enters the PID The scan tool sends it to the vehicle's controller—area network (CAN)-bus, VPW, PWM, ISO, KWP. (After 2008, CAN only). A device on the bus recognizes the PID as one it is responsible for, and reports the value for that PID to the bus. The scan tool reads the response, and displays it to the technician.

The apparatus OBD-2 apparatus 136 uses the CAN bus and OBD-2 PIDs to obtain information from the various components (e.g., GPS 98, etc.) of the vehicle 104.

In one embodiment, the apparatus 138 includes its own new and unique OBD-2 PIDs to practice the invention. However, the present invention is not limited to such an embodiment and the invention can be practiced with and/or with new unique OBD-2 PIDs.

Returning to FIG. 11, the second connector 142 includes a second type of interface 150 for securely providing location information 102 of the vehicle 104 to an external network device 12, 14, 16, 20, 22, 24 only three of each are illustrated, each with one or more processors. The apparatus 136 further includes an electronic circuit 152 including one or more processors 154 inside the case component 138 connected to the male connector 140, the second connector 142 and a non-transitory computer readable medium 156. The electronic circuit 152 is configured for automatically storing and transmitting location information 102 received from the plural electronic signals including time and geo-location data 102 from the vehicle 104 and on onboard Global Positioning System (GPS) 98 or a GPS component of a network device 12, 14, 16 and clock and received as a result of a driver 158 moving and/or driving the vehicle 104 and stored in the non-transitory computer readable medium 156. The computer readable medium includes geofence application 30.

In one embodiment, the OBD-2apparatus 136 further includes a camera interface 160 connected to the case component 138 and electronic circuit 152 for collecting still pictures of the driver 158 of the vehicle 104 and/or the vehicle 104 and/or video of the driver 158 of the vehicle 104 and/or video of the vehicle 104 as the vehicle 104 is moved, towed and/or operated. In such an embodiment, the camera interface 160 is also used to collect pictures of configurations of individual components (e.g., seat, mirror, etc.) within a passenger compartment in the vehicle 104. In another embodiment, a camera component of an external network device 12, 14, 16 is used to collect still pictures and/or video of the driver 158 and/or the vehicle 104 as it is driven, towed of moved. The external network device 12, 14, 16, communicates with the OBD-2apparatus 136 via the second connector 142 via geofence application 30 with a wireless 19" or wired 19' connection to send the still pictures and/or video for storage on the OBD-2apparatus 136. However, the present invention is not limited to such an embodiment and the present invention can be practiced with and/or without the camera interface 160.

In one embodiment, the electronic circuit 152 of the OBD-2apparatus 136 is powered by a power source from the vehicle 104 (e.g., 12 volt, etc.) The power source is obtained from one of the plural receptacles 148 (e.g., pin 16, etc.) in the OBD-2 diagnostic port 146 integral to the vehicle 104.

In another embodiment, the electronic circuit 152 of the OBD-2apparatus 136 receives a first power source from the vehicle 104. When the OBD-2apparatus 136 is unplugged from the OBD-2 diagnostic port 146 integral to the vehicle 104, it has no power. To retrieve the location information 102, the OBD-2apparatus 136 uses a power source supplied to the second connector 142 from an external device 12, 14, 16, 20, 22, 24, etc. via the wired 19' or wireless 19" connection.

However, the present invention is not limited to such embodiments and more, fewer and other combinations of internal and/or external power sources can be used to practice the invention.

In another embodiment the electronic circuit 152 of the OBD-2apparatus 136 is powered by a power source of the second connector 142 (e.g., serial, USB, wireless, etc.).

In another embodiment, the electronic circuit 152 further includes an internal power supply 162 comprising a Direct Current (DC) and/or an Alternating Current (AC) power supply and/or a combination thereof.

The power supply 162 includes an electronic device that supplies electric power to an electrical load. The primary function of a power supply is to convert one form of electrical energy to another and, as a result, power supplies are sometimes referred to as electric power converters. Some power supplies are discrete, stand-alone devices, whereas others are built into larger devices along with their loads. Every power supply must obtain the energy it supplies to its load, as well as any energy it consumes while performing that task, from an energy source. All power supplies have a power input, which connects to the energy source, and a power output that connects to the load. In many power supplies the power input and output consist of electrical connectors.

In one embodiment, the power supply 162 includes a DC power supply. A DC power supply is one that supplies a voltage of fixed polarity (either positive or negative) to its bad. Depending on its design, a DC power supply may be powered from a DC source or from an AC source. DC power supplies, include, but are not limited to, batteries, thermocouples, solar cells, capacitors, etc.

A "battery" is a device consisting of one or more electrochemical cells that convert stored chemical energy into electrical energy. In one embodiment, the apparatus 136, includes a battery with life of about two-four weeks to allow for downloading from the apparatus 136. In one embodiment, a primary and a backup battery is used. However, the present invention is not limited to this embodiment and the invention can be practiced without a backup battery.

A "thermocouple" is a temperature-measuring device consisting of two dissimilar conductors that contact each other at one or more spots. It produces a voltage when the temperature of one of the spots differs from the reference temperature at other parts of the circuit.

A "solar cell" (also called a photovoltaic cell) is an electrical device that converts the energy of light directly into electricity by the photovoltaic effect.

A "capacitor" (originally known as a condenser) is a passive two-terminal electrical component used to store energy electrostatically in an electric field. For example, the mechanical motion of the solenoid valve 24, other valves and/or pumps is used to dispense the condiment can be used re-charge the capacitor.

In another embodiment, the power supply 162 includes an AC power supply.

An AC power supply typically takes the voltage from a main power source, (e.g., 110 volt wall socket, etc.) and lowers it to a desired voltage.

In another embodiment, the power supply 162 includes a switched-mode power supply (SMPS). In an SMPS, the AC mains input is directly rectified and then filtered to obtain a desired DC voltage. The resulting DC voltage is then switched on and off at a high frequency by electronic switching circuitry, thus producing an AC current that will pass through a high-frequency transformer or inductor. Switching occurs at a very high frequency (e.g., typically 10 kHz to 1 MHz), thereby enabling the use of transformers and filter capacitors that are much smaller, lighter, and less expensive than those found in linear power supplies operating at mains frequency. After the inductor or transformer secondary, the high frequency AC is rectified and filtered to produce the desired DC output voltage. In such an embodiment the power is obtained for the SMPS from power source on the vehicle 104.

However, the present invention is not limited to the power supplies discussed and other types of internal and/or external power supplies and/or other combinations of AC and DC power can be used to practice the invention.

The method and system described provide geofencing for desired vehicles. One or more geofences around impound yards are selected. The one or more geofences are associated with one or more vehicles. When a vehicle enters the geofenced area, a user (e.g., an individual, car dealer, finance company, etc.) is immediately notified to prevent excessive impound financial charges. If a vehicle is left in a geofence area, a cumulative time duration and a cumulative finance charge are accurately recorded to reduce or prevent financial fraud.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

We claim:

1. A method for electronic geofencing for vehicles, comprising:
receiving one or more first messages on a location application on a server network device with one or more processors via a cloud communications network from a geofence application on a network device with one or more processors,
wherein the one or more first messages includes geofence location information comprising coordinates for one or more geofences and one or more unique identifiers for one or more vehicles each with one or more processors;
storing the geofence location information from the one or more first messages with the location application on the server network device in one or more databases associated with the server network device on the cloud communications network;

periodically securely sending from the location application on the server network device via the cloud communications network one or more second messages to the one or more vehicles to determine a current location of the one or more vehicles and a subset of the one or more vehicles that are not moving;

receiving securely one or more third messages on the location application on the server network device via the cloud communications network from any of the subset of vehicles that are not moving including current location information for the any of the subset of vehicles that are not moving: and determining from the location application on the server network device with the current location information from the one or more third messages and the geofence location information stored in the one or more databases that a plurality of vehicles, of the subset of vehicles that are not moving, are physically located within any of the one or more geofences, and periodically securely sending based on a pre-determined time period, one or more fourth messages from the location application on the server network device to the geofence application on the network device indicating the plurality of vehicles which are still physically located within one or more of the geofences, and periodically sending the one or more fourth messages based on the pre-determined time period from the location application on the server network device to the geofence application on the network device until all of the plurality of vehicles physically located within all of the geofences are physical removed from within all of the one or more geofences, allowing all of the plurality of vehicles to be timely removed from within all of the one or more geofences without incurring any additional impound fees charged for keeping a selected vehicle inside a selected geofence.

2. The method of claim 1 wherein the one or more vehicles include cars, trucks, boats, snow machines, bicycles, motorcycles, or construction vehicles.

3. The method of claim 1 wherein the one or more geofences include one or more impound yards or one or more parking lots or one or more parking garages in which vehicles are impounded.

4. The method of claim 1 further comprising:
sending securely the one or more second messages to one or more communications components added to the one or more vehicles,
wherein the one or more communications components added to the one or more vehicles include a target network device with one or more processors with a location or geofence application, a Global Positioning System (GPS) apparatus, a portable vehicle onboard diagnostics (OBD) apparatus, or a OBD-2 apparatus.

5. The method of claim 1 wherein a geofence boundary includes a geofence boundary defined by Global Positioning System (GPS) coordinates, two-dimensional geo-space (X, Y) information, three-dimensional (X, Y, Z) geo-space information, two or more street names, or latitude and longitude coordinates.

6. The method of claim 1 wherein the geofence location information includes cellular telephone information, Global Positioning System (GPS) coordinates, two-dimensional geo-space (X, Y) information, three-dimensional (X, Y, Z) geo-space information, Wireless Fidelity (Wi-Fi) signal information, Wi-Fi Aware signal information, Bluetooth signal information, near field communications (NFC) signal information, machine-to-machine (M2M) communications signal information, radio frequency identifier (RFID) signal information, or cell tower signal information.

7. The method of claim 1 wherein the one or more fourth messages include one or more voice messages, short message service (SMS) messages, e-mail messages, social media messages, audio messages, video messages or multimedia messages.

8. The method of claim 1 wherein the location application on the server network device and the geofence application on the network device include cloud applications communicating with the cloud communications network, the cloud applications providing geofencing location services including a cloud computing Infrastructure as a Service (IaaS), a cloud computing Platform, as a Service (PaaS) and offers Specific cloud geofencing location services as a Service (SaaS) including a cloud software service.

9. The method of claim 1 wherein the network device with the geofence application includes a target network device with one or more processors or another server network device with one or more processors.

10. The method of claim 1 wherein the one or more database include one or more cloud storage objects comprising one or more of a Representational State Transfer (REST) or Simple Object Access Protocol (SOAP), Lightweight Directory Access Protocol (LDAP) cloud storage objects, portions thereof, or combinations thereof, stored in the one or more databases.

11. The method of claim 1 wherein the step of receiving securely one or more third messages includes securely receiving the one or more third messages generated by one or more of wireless cellular telephone signals, Global Positioning System (GPS) signals, Wireless Fidelity (Wi-Fi) signals, Wi-Fi Aware signals, Bluetooth signals, near field communications (NFC) signal, machine-to-machine (M2M) communications signal, radio frequency identifier (RFID) signal, or cell tower signals being sent from the one or more vehicles.

12. The method of claim 1 wherein the unique identifiers for the one or more vehicles include Uniform Resource Identifiers (URIs) and/or Uniform Resource Names (URNs), and/or Uniform Resource Locators (URLs) unique across the communications network, vehicle license numbers or vehicle identification numbers (VINs).

13. The method of claim 1 wherein the server network device, the network device and the one or more vehicles include one or more wireless communications interfaces comprising: cellular telephone, 802.11a, 802.11b, 802.11g, 802.11n, 802.15.4 (ZigBee), "Wireless Fidelity" (Wi-Fi), Wi-Fi Aware, "Worldwide Interoperability for Microwave Access" (WiMAX), ETSI High Performance Radio Metropolitan Area Network (HIPERMAN), Near Field Communications (NFC), Machine-to-Machine (M2M), Bluetooth or infra data association (IrDA) wireless communication interfaces.

14. The method of claim 1 further comprising:
defining from a geofence application on a target network device with one or more processors, one or more geofences via a graphical user interface (GUI) on a graphical map;
selecting with the geofence application on the target network devices one or more vehicles each with a unique identifier to associate with the defined one or more geofences via the GUI;

sending securely one or more geofence messages from the geofence application on the target network device to the location application on the server network device via the cloud communications network including the geofence and vehicle information; and receiving securely on the geofence application on the target network device via the cloud communications network one or more new geofence messages while any of the one or more vehicles is stationary and physically located in any of the one or more defined geofences.

15. The method of claim 1 wherein the step of periodically securely sending from the location application on the server network device one or more second messages to the one or more vehicles to determine whether any of the one or more vehicles are not moving further includes securely sending the one or more second messages periodically based on a first pre-determined time period.

16. The method of claim 15 wherein the first predetermined time period includes at least a two minute time period and wherein the one or more second messages are securely sent at least once every two minutes.

17. The method of claim 1 wherein the step of periodically securely sending one or more fourth messages based on a pre-determined time period from the location application server network device to the geofence application on the network device indicating the plurality of vehicles which are is physically located within which geofence further includes:
periodically securely sending the one or more fourth messages based on a second pre-determined time period different from the pre-determined time period.

18. The method of claim 17 wherein the second predetermined time period includes at least a four hour time period and wherein the one or more fourth messages are securely sent at least once every four hours.

19. A geofencing system, comprising in combination:
one or more vehicles each with one or more processors;
one or more server network devices each with one or more processors:
one or more network devices each with one or more processors;
one or more target network devices each with one or more processors;
the one or more processors on the one or more server network devices, one or more network devices or more target network devices including a plurality of instructions causing the one or more processors to be configured:
for receiving one or more first messages on a location application on a server network device with one or more processors via a cloud communications network from a geofence application on a network device with one or more processors,
wherein the one or more first messages includes geofence location information comprising coordinates for one or more geofences and one or more unique identifiers for one or more vehicles each with one or more processors;
for storing the geofence location information from the one or more first messages with the location application on the server network device in one or more databases associated with the server network device on the cloud communications network;
for periodically securely sending from the location application on the server network device via the cloud communications network one or more second messages to the one or more vehicles to determine a current location of the one or more vehicles and whether any of the one or more vehicles are not moving;

for receiving securely one or more third messages on the location application on the server network device via the cloud communications network from any of the one or more vehicles that are not moving including current location information for the one or more vehicles; and for determining from the location application on the server network device with the current location information from the one or more third messages and the geofence location information stored in the one or more databases whether any of the vehicles that are not moving are physically located within any of the one or more geofences, and if so, for periodically securely sending based on a pre-determined time period, one or more fourth messages from the location application on the server network device to the geofence application on the network device indicating a plurality of the one or more vehicles which are still physically located within one or more of the geofences, and for periodically securely sending the one or more fourth messages based on the pre-determined time period from the location application on the server network device to the geofence application on the network device until all of the plurality of vehicles physically located within all of the geofences are physical removed from within all of the one or more geofences, allowing all of the plurality of vehicles to be timely removed from within all of the one or more geofences without incurring any additional impound fees charged for keeping a selected vehicle inside a selected geofence;

for calculating from the location application on the server network device a total time duration and a cumulative financial charge for any vehicle left within any geofence, the calculated total time duration and the calculated cumulative financial charge reducing or preventing any financial fraud for any vehicle left within any geofence;

for defining from a geofence application on a target network device with one or more processors, one or more geofences via a graphical user interface (GUI) on a graphical map;

for selecting with the geofence application on the target network devices one or more vehicles each with a unique identifier to associate with the defined one or more geofences via the GUI;

for securely sending one or more geofence messages from the geofence application on the target network device to the location application on the server network device via the cloud communications network including the geofence and vehicle information; and for securely receiving on the geofence application on the target network device via the cloud communications network one or more new geofence messages when any of the one or more vehicles is stationary and physically located in any of the one or more defined geofences.

20. A non-transitory computer readable medium having stored therein a plurality of instructions configured for causing one or more processors on one or more network devices to execute a plurality of steps comprising:
receiving one or more first messages on a location application on a server network device with one or more processors via a cloud communications network, from a geofence application on a network device with one or more processors, wherein the one or more first messages includes geofence location information comprising coordinates for one or more geofences and one or more unique identifiers for one or more vehicles each with one or more processors;

storing the geofence location information from the one or more first messages with the location application on the server network device in one or more databases associated with the server network device on the cloud communications network;

periodically securely sending from the location application on the server network device via the cloud communications network one or more second messages to the one or more vehicles to determine a current location of the one or more vehicles and whether any of the one or more vehicles are not moving;

receiving securely one or more third messages on the location application on the server network device via the cloud communications network from any of the one or more vehicles that are not moving including current location information for the one or more vehicles; and determining from the location application on the server network device with the current location information from the one or more third messages and the geofence location information stored in the one or more databases whether any of the vehicles that are not moving are physically located within any of the one or more geofences, and if so, periodically securely sending based on a pre-determined time period, one or more fourth messages from the location application on the server network device to the geofence application on the network device indicating a plurality of the one or more vehicles which are still physically located within one or more of the geofences, and periodically securely sending the one or more fourth messages based on the pre-determined time period from the location application on the server network device to the geofence application on the network device until all of the plurality of vehicles physically located within all of the geofences are physical removed from within all of the one or more geofences, allowing all of the plurality of vehicles to be timely removed from within all of the one or more geofences without incurring any additional impound fees charged for keeping a selected vehicle inside a selected geofence.

* * * * *